US012328097B2

(12) United States Patent
Gu

(10) Patent No.: US 12,328,097 B2
(45) Date of Patent: *Jun. 10, 2025

(54) METHOD, APPARATUS, AND SYSTEM FOR OBTAINING ELECTRONIC LAYOUT APPLIED TO PHOTOVOLTAIC ARRAY

(71) Applicant: Huawei Digital Power Technologies Co., Ltd., Shenzhen (CN)

(72) Inventor: Guilei Gu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,856

(22) Filed: Sep. 28, 2023

(65) Prior Publication Data

US 2024/0088830 A1    Mar. 14, 2024

Related U.S. Application Data

(63) Continuation of application No. 17/446,853, filed on Sep. 3, 2021, now Pat. No. 11,799,418, which is a (Continued)

(30) Foreign Application Priority Data

Mar. 4, 2019 (CN) .......................... 201910161773.0
May 21, 2019 (CN) .......................... 201910425599.6

(51) Int. Cl.
*H02S 40/34* (2014.01)
*G06F 30/13* (2020.01)
(Continued)

(52) U.S. Cl.
CPC .............. *H02S 40/34* (2014.12); *G06F 30/13* (2020.01); *G06V 30/422* (2022.01);
(Continued)

(58) Field of Classification Search
CPC ...... G06F 30/00; G06F 30/13; G06F 2111/20; H02S 40/34; H02S 10/00; H02S 50/00;
(Continued)

(56) References Cited

U.S. PATENT DOCUMENTS

| 2009/0304282 A1 | 12/2009 | Predovic et al. |
| 2012/0310427 A1 | 12/2012 | Williams et al. |
| 2017/0255803 A1* | 9/2017 | Yoscovich .............. G06F 17/11 |

FOREIGN PATENT DOCUMENTS

| CN | 106548116 A | 3/2017 |
| CN | 107423501 A | 12/2017 |

(Continued)

OTHER PUBLICATIONS

Boyd, Matthew T., "High-Speed Monitoring of Multiple Grid-Connected Photovoltaic Array Configurations", Oct. 2015, NIST Technical Note 1896, National Institute of Standards and Technology, U.S. Department of Commerce. (Year: 2015).*

(Continued)

*Primary Examiner* — Cedric Johnson
(74) *Attorney, Agent, or Firm* — WOMBLE BOND DICKINSON (US) LLP

(57) ABSTRACT

This application discloses a method, an apparatus, and a system for obtaining electronic layout applied to photovoltaic array in the field of equipment installation management. According to the method, the electronic device identifies each first area in a target picture to obtain position information and a module identifier of at least one photovoltaic module in each first area, and may directly obtain an electronic layout based on the position information and the module identifier of each photovoltaic module. In this way, a product identifier of each converter does not need to be manually obtained, and a photovoltaic module does not need to be manually added to the electronic layout. This reduces (Continued)

labor time consumption and improves efficiency of obtaining the electronic layout.

20 Claims, 20 Drawing Sheets

Related U.S. Application Data continuation of application No. PCT/CN2019/120692, filed on Nov. 25, 2019.

(51) Int. Cl.
| | | |
|---|---|---|
| *G06V 30/422* | (2022.01) | |
| *H01G 9/20* | (2006.01) | |
| *H10F 19/90* | (2025.01) | |
| *G06F 111/20* | (2020.01) | |

(52) U.S. Cl.
CPC ......... *H01G 9/2068* (2013.01); *H10F 19/902* (2025.01); *G06F 2111/20* (2020.01)

(58) Field of Classification Search
CPC ...... H02S 50/10; G06V 30/422; G06V 10/22; H01G 9/2068; H01L 31/0504; H10F 19/902
USPC ........................................................... 703/1
See application file for complete search history.

(56) References Cited

FOREIGN PATENT DOCUMENTS

| | | | | |
|---|---|---|---|---|
| CN | 108229232 A | | 6/2018 | |
| CN | 108572975 A | | 9/2018 | |
| CN | 109410312 A | * | 3/2019 | ............. G06F 30/13 |
| CN | 110084226 A | * | 8/2019 | ............. G06F 30/13 |
| EP | 973106 A2 | | 1/2000 | |
| JP | 2009032945 A | | 2/2009 | |
| JP | 2012232804 A | | 11/2012 | |
| JP | 2013529324 A | | 7/2013 | |
| JP | 2017041047 A | | 2/2017 | |
| JP | 2020046697 A | | 3/2020 | |
| KR | 20050023482 A | | 3/2005 | |
| KR | 101257668 B1 | * | 4/2013 | |

OTHER PUBLICATIONS

Srikanth Sridar et al.,"Circuit Recognition Using Netlist",Proceedings of the 2013 IEEE Second International Conference on Image Information Processing (ICIIP-2013), Dec. 9, 2013, total 5 pages.

Mahdi Rabbani et al.,"Hand Drawn Optical Circuit Recognition", 7th International conference on Intelligent Human Computer Interaction, IHCI 2015, May 11, 2016, total 8 pages.

Boyd, Matthew T., "High-Speed Monitoring of Multiple Grid-Connected Photovoltaic Array Configurations", Oct. 2015, NIST ( National Institute of Standards and Technology), U.S. Department of Commerce. (Year: 2015).

Ravi Palakodety and Vijay Shah:"Hand-Drawn Circuit Recognition." May 2005, total 16 pages.

* cited by examiner

METHOD, APPARATUS, AND SYSTEM FOR OBTAINING ELECTRONIC LAYOUT APPLIED TO PHOTOVOLTAIC ARRAY

CROSS-REFERENCE TO RELATED APPLICATIONS

This application is a continuation of U.S. patent application Ser. No. 17/446,853, filed on Sep. 3, 2021, which is a continuation of International Application No. PCT/CN2019/120692, filed on Nov. 25, 2019. The International Application claims priority to Chinese Patent Application No. 201910161773.0, filed on Mar. 4, 2019 and Chinese Patent Application No. 201910425599.6, filed on May 21, 2019. All of the afore-mentioned patent applications are hereby incorporated by reference in their entireties.

TECHNICAL FIELD

This application relates to the field of device mounting management, and in particular, to a method, an apparatus, and a system for obtaining an electronic layout applied to a photovoltaic array, an electronic device, and a computer storage medium.

BACKGROUND

With the advancement of technologies, photovoltaic power generation systems are more and more widely applied to people's life, such as a solar street lamp, a solar water heater, and a photovoltaic station. To resolve a problem of series-parallel connection of photovoltaic modules in the photovoltaic power generation system, a converter is usually mounted below each photovoltaic module in a photovoltaic array. When any converter in the photovoltaic power generation system fails, through reporting of the photovoltaic power generation system, a skilled person may search, by using a product serial number of the faulty converter, an electronic layout of the photovoltaic array for a photovoltaic module bound to the product serial number, so that the skilled person only needs to open the found photovoltaic module to find the faulty converter.

Currently, an electronic layout may be obtained in the following processes. A paper layout that is of a photovoltaic array and that includes a 6×10 table is prepared, each cell in the table represents one photovoltaic module, and a position of each cell in the table is a position of a photovoltaic module corresponding to the cell in the photovoltaic array. For example, a photovoltaic module in the first row and the first column in the photovoltaic array corresponds to a cell in the first row and the first column in the table. When mounting a converter, the skilled person records a physical position of the converter in the paper layout. For example, a converter 1 is mounted below a photovoltaic module 1 in the first row and the first column in the photovoltaic array, and after the mounting of the converter 1 is completed, the skilled person removes a two-dimensional code 1 that stores a product serial number and that is on the converter 1, and pastes the removed two-dimensional code 1 on a cell 1A corresponding to the photovoltaic module 1. When no converter is mounted below a photovoltaic module, a small box in a center of a cell corresponding to the photovoltaic module is painted black to indicate that no converter is mounted below the photovoltaic module. Therefore, the paper layout may record whether a converter is mounted below each photovoltaic module in the photovoltaic array. Application (APP) software is used to manually draw an electronic layout. Based on the paper layout, the skilled person adds a photovoltaic module to the electronic layout, and manually scans a two-dimensional code pasted in the paper layout to obtain a product serial number of a converter. Then, the skilled person binds the obtained product serial number of the converter to the corresponding photovoltaic module in the electronic layout. After adding of all photovoltaic modules in the paper layout is completed and binding of product serial numbers on all two-dimensional codes to corresponding photovoltaic modules is completed, the skilled person may obtain the electronic layout of the photovoltaic array.

During the obtaining of the electronic layout, the skilled person needs to manually scan two-dimensional codes in the paper layout one by one to obtain a product serial number of a converter stored in each two-dimensional code, and also needs to manually bind each product serial number to a corresponding photovoltaic module in the electronic layout. Consequently, a relatively long labor time is consumed, and efficiency of obtaining the electronic layout is relatively low.

SUMMARY

Embodiments of this application provide a method, an apparatus, and a system for obtaining an electronic layout applied to a photovoltaic array, to resolve a problem of low obtaining efficiency in a process of obtaining an electronic layout applied to a photovoltaic array. The technical solutions are as follows:

According to a first aspect, a method for obtaining an electronic layout applied to a photovoltaic array is provided, and the method is applied to an electronic device and includes:

obtaining, by the electronic device, a target picture, where the target picture includes at least one first area, and the first area is used to indicate position information and a module identifier of at least one photovoltaic module in a photovoltaic array, where the position information is used to indicate a relative position of the photovoltaic module in the photovoltaic array, and the module identifier includes a first-type module identifier and a second-type module identifier, where the first-type module identifier is used to indicate that a converter is mounted below the photovoltaic module, and the second-type module identifier is used to indicate that no converter is mounted below the photovoltaic module;

identifying, by the electronic device, each first area in the target picture to obtain position information and a module identifier of at least one photovoltaic module in each first area; and obtaining, by the electronic device, an electronic layout of the photovoltaic array based on the position information and the module identifier of the at least one photovoltaic module in each first area.

In an embodiment, the identifying, by the electronic device, each first area in the target picture to obtain position information and a module identifier of at least one photovoltaic module in each first area includes:

detecting, by the electronic device, a position of each first area in the target picture to obtain coordinate information of the at least one photovoltaic module in each first area in the target picture;

using, by the electronic device, the coordinate information of the at least one photovoltaic module in each first area as the position information of the at least one photovoltaic module in the first area; and performing, by the electronic device, identification at a preset position of the at least one photovoltaic module in each first area to obtain the module identifier of the at least one photovoltaic module in each first area.

In an embodiment, the obtaining, by the electronic device, an electronic layout of the photovoltaic array based on the position information and the module identifier of the at least one photovoltaic module in each first area includes:

obtaining, by the electronic device, a result list based on the position information and the module identifier of the at least one photovoltaic module in each first area;

adding, by the electronic device, one virtual module at a corresponding position in a template of the electronic layout based on each piece of position information in the result list, where the virtual module corresponds to one photovoltaic module in the photovoltaic array; and binding, by the electronic device, each product identifier in the result list to at least one corresponding virtual module in the template of the electronic layout to obtain the electronic layout of the photovoltaic array.

Based on the foregoing possible implementation, a product identifier of each converter does not need to be manually obtained, and a photovoltaic module does not need to be manually added to the electronic layout, thereby reducing labor time consumption and improving efficiency of obtaining the electronic layout.

In an embodiment, the obtaining, by the electronic device, a result list based on the position information and the module identifier of the at least one photovoltaic module in each first area includes:

when a module identifier of any photovoltaic module in any first area is a first-type module identifier, parsing, by the electronic device, the module identifier to obtain a product identifier indicated by the module identifier, and associating, by the electronic device, the product identifier with position information of at least one photovoltaic module in the first area and storing the product identifier and the position information of the at least one photovoltaic module in the first area in the result list; and when the module identifier of the any photovoltaic module in the any first area is a second-type module identifier, outputting, by the electronic device, a null identifier, and associating, by the electronic device, the null identifier with position information of the module identifier and storing the null identifier and the position information of the module identifier in the result list.

Based on the foregoing possible implementation, the electronic device obtains the electronic layout based on data in the list, so that the position information of the at least one photovoltaic module in the first area identified by the electronic device corresponds to the product identifier. When the product identifier is being bound, a to-be-bound virtual module may be determined based on the correspondence between the product identifier and the position information in the list without a need to determine the correspondence between the product identifier and the position information from the target picture.

In an embodiment, the obtaining, by the electronic device, an electronic layout of the photovoltaic array based on the position information and the module identifier of the at least one photovoltaic module in each first area includes:

when position information of at least one photovoltaic module in one first area is obtained, adding, by the electronic device, at least one virtual module to a template of the electronic layout of the photovoltaic array, where the virtual module corresponds to one photovoltaic module in the photovoltaic array;

when any module identifier that is in the first area and that is a first-type module identifier is obtained, parsing, by the electronic device, the module identifier to obtain a product identifier; and binding, by the electronic device, the product identifier to the at least one virtual module corresponding to the at least one photovoltaic module in the first area, to obtain the electronic layout of the photovoltaic array.

Based on the foregoing possible implementation, the electronic device may draw the electronic layout while identifying the first area in the target picture, thereby improving efficiency of obtaining the electronic layout.

In an embodiment, the obtaining, by the electronic device, a target picture includes:

obtaining, by the electronic device, the target picture by photographing or scanning a paper layout, where the paper layout includes at least one area, and at least one module identifier is marked in each area.

In an embodiment, the method further includes:

storing, by the electronic device, the electronic layout of the photovoltaic array in a plurality of devices in a photovoltaic power generation system, where the plurality of devices in the photovoltaic power generation system support data synchronization and backup.

Based on the foregoing possible implementation, the electronic layout obtained by the electronic device may be stored in the plurality of devices in the photovoltaic power generation system, and the plurality of devices can support data synchronization and backup, thereby avoiding a loss of the electronic layout.

According to a second aspect, an apparatus for obtaining an electronic layout applied to a photovoltaic array is provided, to perform the foregoing method for obtaining an electronic layout applied to a photovoltaic array. The apparatus for obtaining an electronic layout includes a function module for performing the foregoing method for obtaining an electronic layout applied to a photovoltaic array provided in any one of the first aspect and the optional manners of the first aspect.

According to a third aspect, a system for obtaining an electronic layout applied to a photovoltaic array is provided, and the system includes a photovoltaic module, a converter, and an electronic device, and is used to perform the foregoing method for obtaining an electronic layout applied to a photovoltaic array. The system for obtaining an electronic layout applied to a photovoltaic array includes a function module for performing the foregoing method for obtaining an electronic layout applied to a photovoltaic array provided in any one of the first aspect and the optional manners of the first aspect.

According to a fourth aspect, an electronic device is provided, and the electronic device includes a processor and a memory. The memory stores at least one instruction, and the instruction is loaded and executed by the processor to implement the operations of the foregoing method for obtaining an electronic layout applied to a photovoltaic array.

According to a fifth aspect, a computer readable storage medium is provided. The storage medium stores at least one instruction, and the instruction is loaded and executed by a processor to implement the operations of the foregoing method for obtaining an electronic layout applied to a photovoltaic array.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes the implementations of this application in detail with reference to the accompanying drawings.

Figure 1:
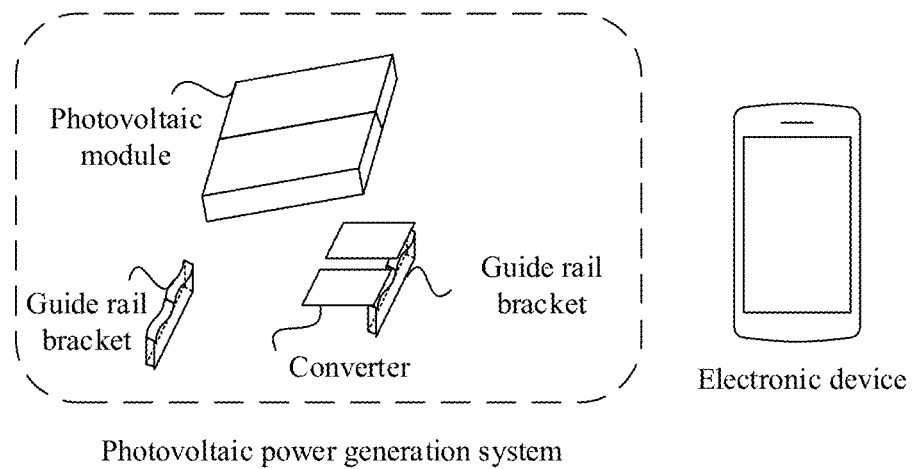
FIG. 1 is a schematic diagram of an implementation environment according to an embodiment of this application.

FIG. 1 is a schematic diagram of an implementation environment according to an embodiment of this application. Referring to FIG. 1, the implementation environment includes a photovoltaic power generation system and an electronic device.

The photovoltaic power generation system is a power generation system that converts solar energy into electric energy. The photovoltaic power generation system includes a photovoltaic module, a guide rail bracket, and a converter. The photovoltaic module is configured to convert solar energy into a direct current. The direct current may be directly connected to a public power grid after being converted by a grid-tied inverter into an alternating current that meets a requirement of a mains power grid, to supply power to a user. To enable the user to obtain a relatively high output voltage or output current, a plurality of photovoltaic modules may be connected in series and in parallel to form a photovoltaic array. The guide rail bracket is mounted below the photovoltaic module to support the photovoltaic module. The converter is configured to resolve a mismatch problem of series-parallel connection of the photovoltaic modules, so that each photovoltaic module can be connected to one converter. The converter may be a photovoltaic converter that has an independent maximum power point tracking (maximum MPPT) function. In an actual mounting process, a converter is usually mounted on the guide rail bracket. When a photovoltaic module connected to the converter is mounted on the guide rail bracket, the converter is hidden below the photovoltaic module. The photovoltaic power generation system may further include devices such as an inverter and a network management device, and the devices in the photovoltaic power generation system support synchronous data storage.

To obtain an electronic layout, this embodiment of this application provides a paper layout to record a position of each photovoltaic module in the photovoltaic power generation system in the photovoltaic array and a mounting status of a converter. A table may be drawn in the paper layout, and each cell in the table is used to represent at least one photovoltaic module.

The electronic device is configured to: generate a target picture by using the paper layout, or import a target picture generated by another electronic device by using the paper layout, automatically generate an electronic layout based on the target picture, and store the electronic layout in the devices in the photovoltaic power generation system. Target APP software may be installed in the electronic device, and the target APP software is used to identify the target picture and generate the electronic layout based on an identification result.

The electronic layout is used to record a position of each photovoltaic module in the photovoltaic power generation system in the photovoltaic array and a mounting status of a convert. The electronic layout may be stored in a plurality of devices in the photovoltaic power generation system, for example, the electronic layout is stored in the inverter, the converter, and the network management device in the photovoltaic power generation system, and the electronic layout supports mutual synchronization and backup among the inverter, the converter, and the network management device, thereby ensuring that the electronic layout is not lost in a single-device failure scenario. For example, if the inverter fails, after a new inverter is mounted, the new inverter supports synchronization of the electronic layout from the converter or the network management device.

Figure 2:
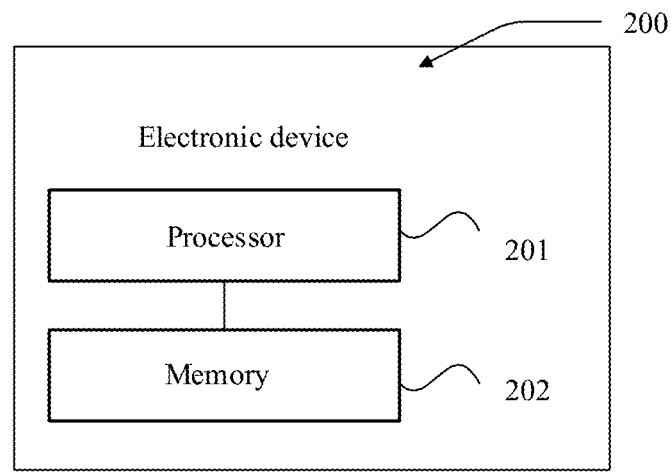
FIG. 2 is a schematic structural diagram of an electronic device according to an embodiment of this application.

FIG. 2 is a schematic structural diagram of an electronic device according to an embodiment of this application. An electronic device 200 may vary greatly due to a difference in configuration or performance, and may include one or more central processing units (CPU) 201 and one or more memories 202. The memory 202 stores at least one instruction, and the at least one instruction is loaded and executed by the CPU 201 to implement the method provided in the following method embodiments. Certainly, the electronic device 200 may further have components such as a wired or wireless network interface, a keyboard, and an input/output interface, to perform input/output. The electronic device 200 may further include another component for implementing a device function. Details are not described herein.

In an example embodiment, a computer readable storage medium is further provided, for example, a memory including an instruction, and the instruction may be executed by a processor in a terminal to complete a method for obtaining an electronic layout applied to a photovoltaic array in the following embodiment. For example, the computer readable storage medium may be a read-only memory (ROM), a random access memory (RAM), a compact disc read-only memory (CD-ROM), a tape, a floppy disk, or an optical data storage device.

Figure 3:
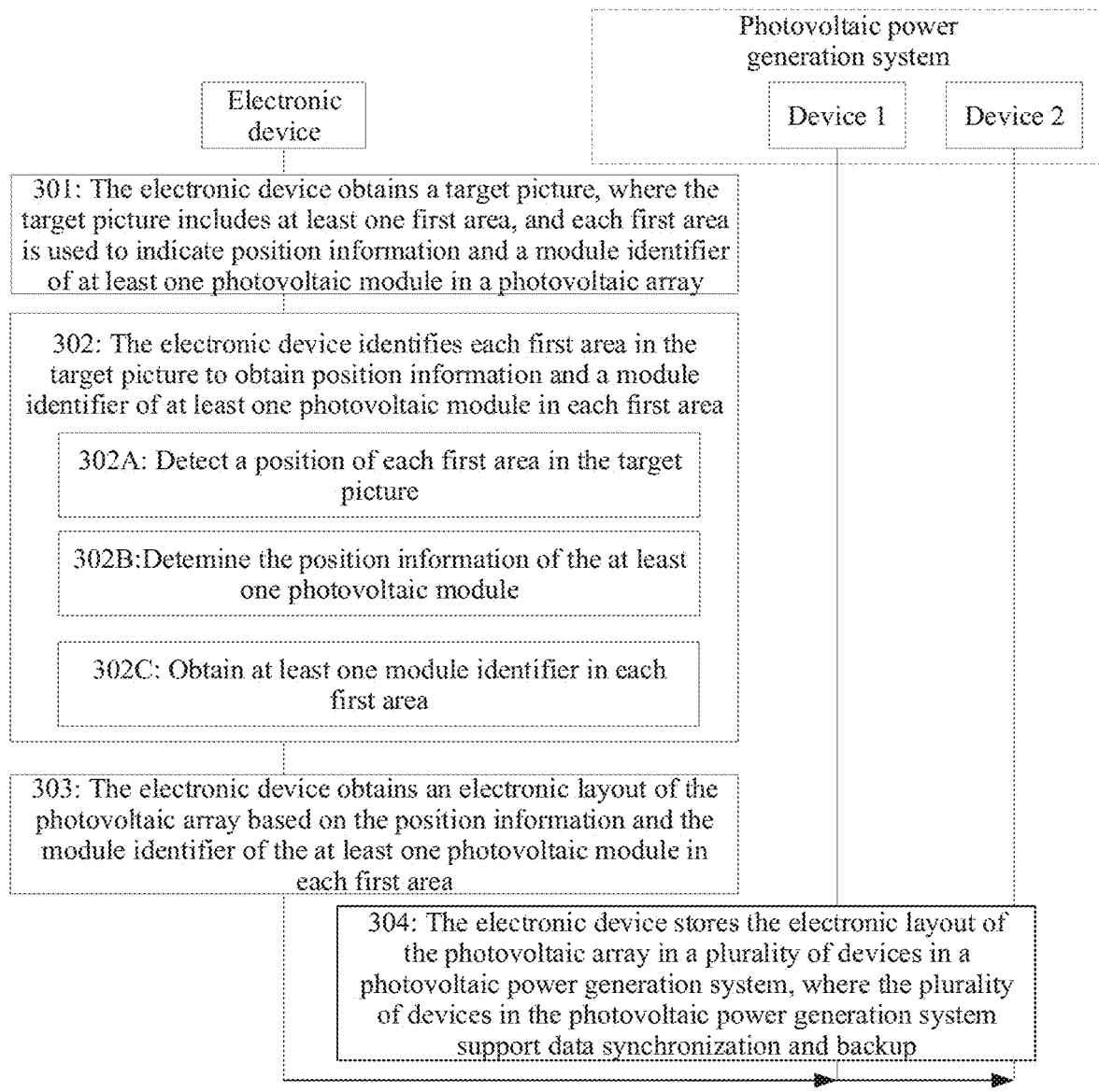
FIG. 3 is a flowchart of a method for obtaining an electronic layout applied to a photovoltaic array according to an embodiment of this application.

The implementation environment of obtaining the electronic layout is described above. Further, to reflect a process of obtaining the electronic layout, a specific embodiment is used herein for description. FIG. 3 is a flowchart of a method for obtaining an electronic layout applied to a photovoltaic array according to an embodiment of this application. A procedure of the method provided in this embodiment of this application includes the following operations.

301. An electronic device obtains a target picture, where the target picture includes at least one first area, and each first area is used to indicate position information and a module identifier of at least one photovoltaic module in a photovoltaic array.

In a possible manner, the electronic device obtains the target picture by photographing or scanning a paper layout.

In another possible manner, the target picture is obtained by photographing or scanning a paper layout by using another electronic device, and then is imported into the electronic device.

This embodiment of this application is not limited to obtaining of the target picture through photographing or scanning, and the target picture may be obtained in another manner.

In another embodiment of this application, the target picture is not a physical picture in a strict sense, but an information carrier for carrying position information and module identifier information.

Figure 4:
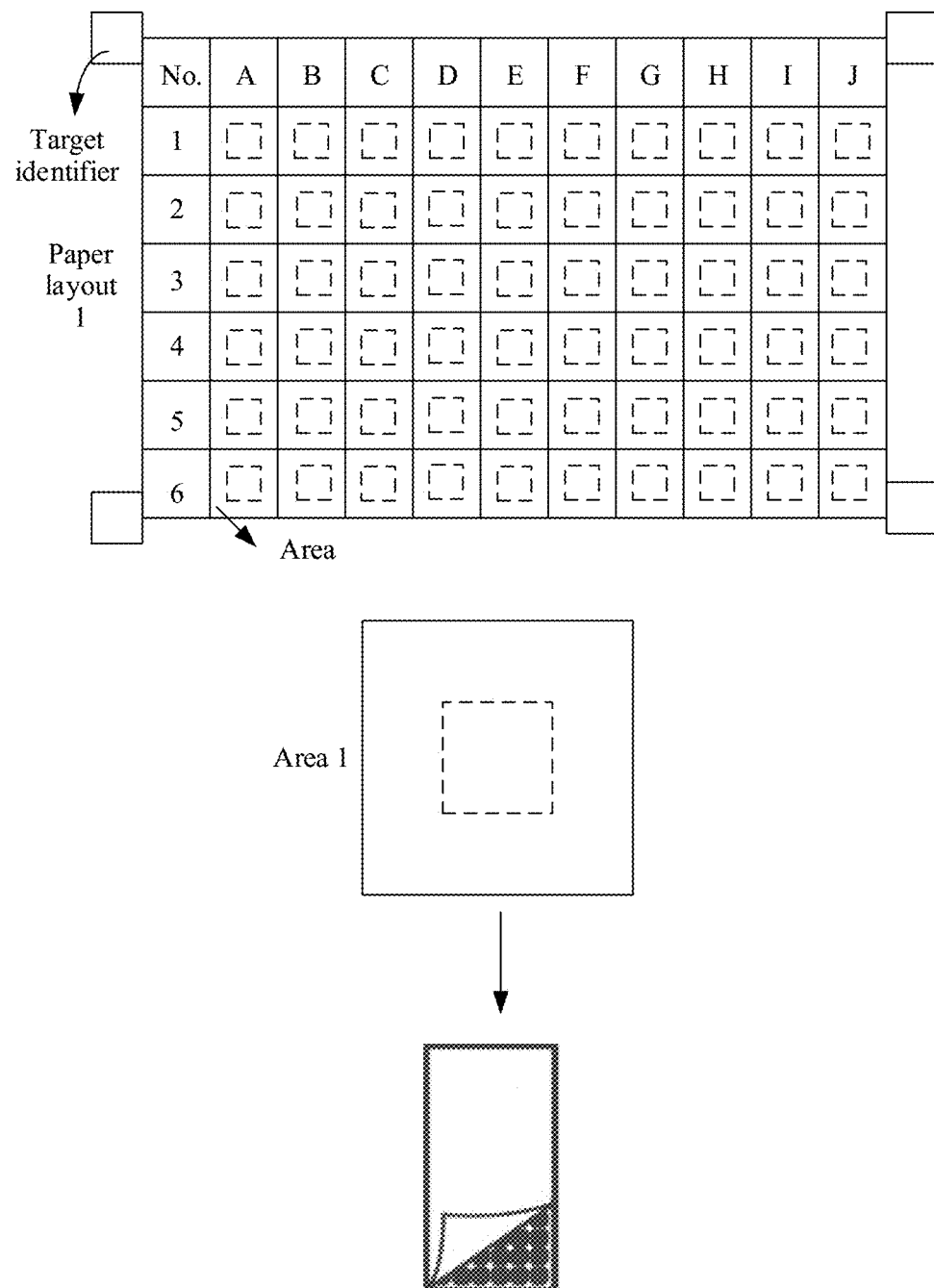
FIG. 4 is a schematic diagram of a paper layout according to an embodiment of this application.
Figure 5:
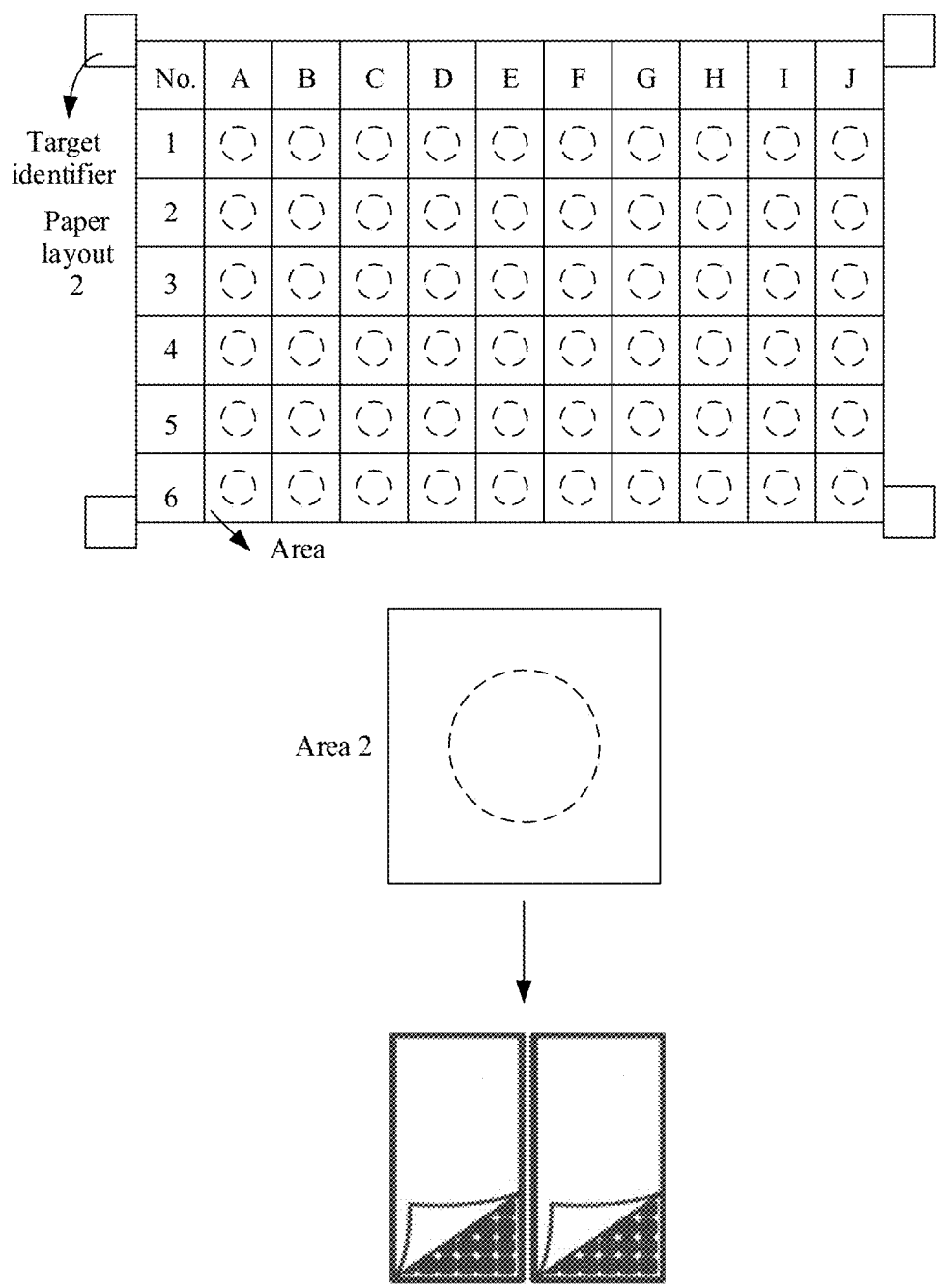
FIG. 5 is a schematic diagram of a paper layout according to an embodiment of this application.
Figure 6:
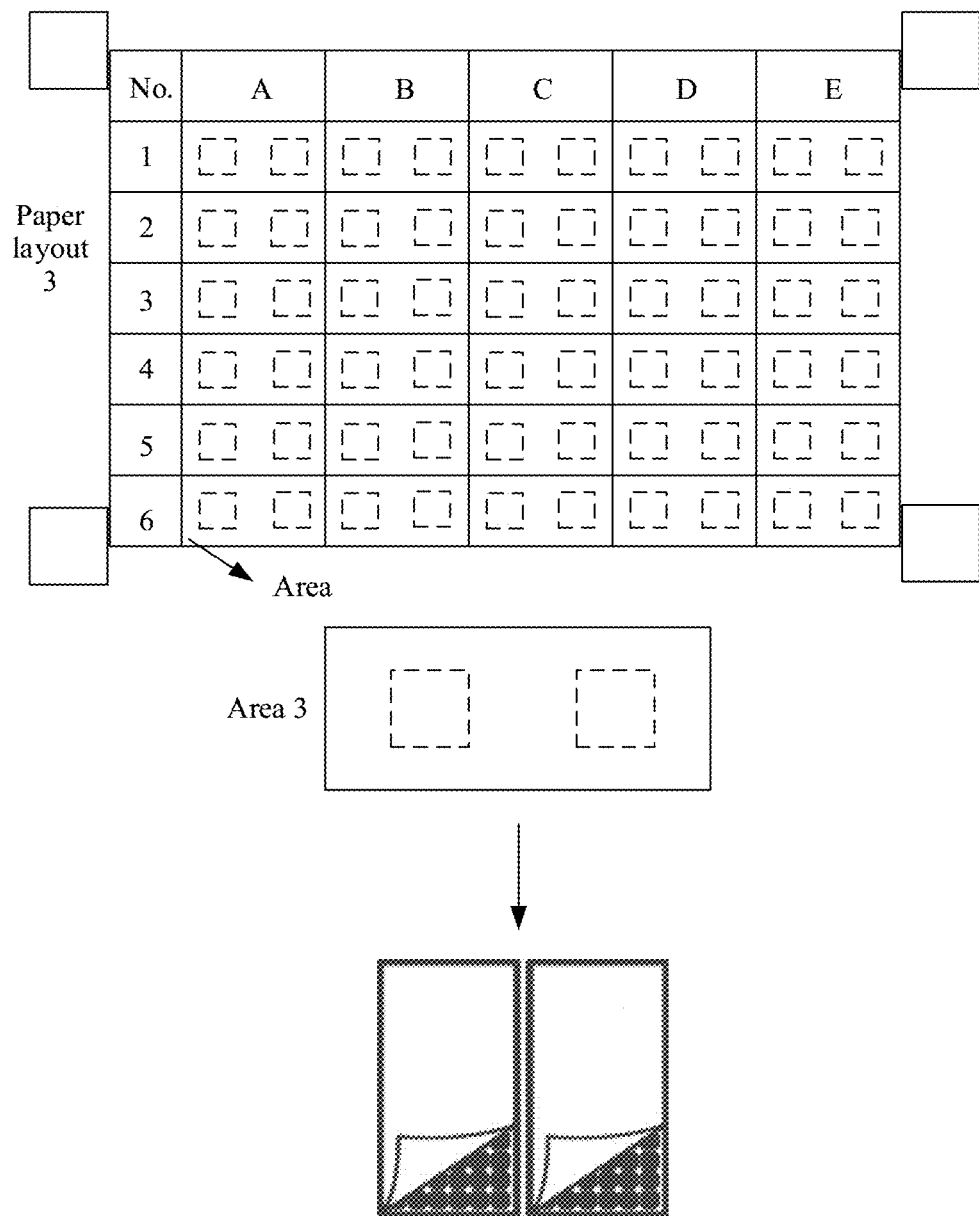
FIG. 6 is a schematic diagram of a paper layout according to an embodiment of this application.

The target picture is a picture version of the paper layout. The paper layout records a position of each photovoltaic module in the photovoltaic array and a mounted converter in the photovoltaic array. For the paper layout, the paper layout includes at least one area. At least one module identifier is marked in each area, and each module identifier corresponds to at least one photovoltaic module in the photovoltaic array. An area identifier may be further marked in each area, and different area identifiers are used to indicate that quantities of photovoltaic modules indicated by areas are different. For example, FIG. 4 is a schematic diagram of a paper layout according to an embodiment of this application. An area identifier in an area 1 in FIG. 4 is a dashed-line box, and the dashed-line box may indicate that the area 1 indicates one photovoltaic module. For another example, FIG. 5 is a schematic diagram of a paper layout according to an embodiment of this application. An area identifier in an area 2 in FIG. 5 is a dashed-line circle, and the dashed-line circle may indicate that the area indicates two photovoltaic modules. Certainly, there may be at least one area identifier in each first area, and each area identifier may represent at least one photovoltaic module. For example, FIG. 6 is a schematic diagram of a paper layout according to an embodiment of this application. There are two area identifiers composed of two dashed-line boxes in an area 3 in FIG. 6, each area identifier may represent one photovoltaic module, and the area 3 indicates two parallel photovoltaic modules in a photovoltaic array. A left area identifier in the area 3 is used to indicate a left photovoltaic module in the two parallel photovoltaic modules, and a right area identifier in the area 3 is used to indicate a right photovoltaic module in the two parallel photovoltaic modules.

It should be noted that area identifiers in each area in the paper layout may be area identifiers of a same type, that is, each area in the paper layout indicates a same quantity of photovoltaic modules. Area identifiers in each area in the paper layout may be area identifiers of different types, that is, each area in the paper layout indicates different quantities of photovoltaic modules.

A table is drawn in the paper layout, and the entire table represents one photovoltaic array. Each cell in the table is an area in the paper layout, that is, each cell represents at least one photovoltaic module in the photovoltaic array. Each row in the table has one index, for example, 1, 2, 3 . . . , and each column also has one index, for example, A, B, C . . . . In this case, any cell in the table may be represented by using a row index and a column index. For example, an area in the first row and the first column in FIG. 4 may be represented as A1. The area A1 represents at least one photovoltaic module in the first row and the first column in the photovoltaic array.

The module identifier includes a first-type module identifier and a second-type module identifier. The first-type module identifier is used to indicate that a converter is mounted below the photovoltaic module, and the second-type module identifier is used to indicate that no converter is mounted below the photovoltaic module. A carrier of the first-type module identifier may be a two-dimensional code of a converter, the two-dimensional code is used to indicate a product identifier of the converter, and the product identifier may be identifier information such as a product serial number of the converter. The second-type module identifier may be any identifier that can be identified by software except the first-type module identifier, for example, a small black box.

A carrier of each module identifier in this embodiment of this application is not limited to a two-dimensional code, and may be an information carrier or an identifier symbol in another form such as a one-dimensional code.

In some embodiments of this application, the module identifier includes a first-type module identifier or a second-type module identifier, that is, module identifiers are all first-type module identifiers, or may be all second-type module identifiers, or may be a combination of the first-type module identifier and the second-type module identifier.

Figure 7:
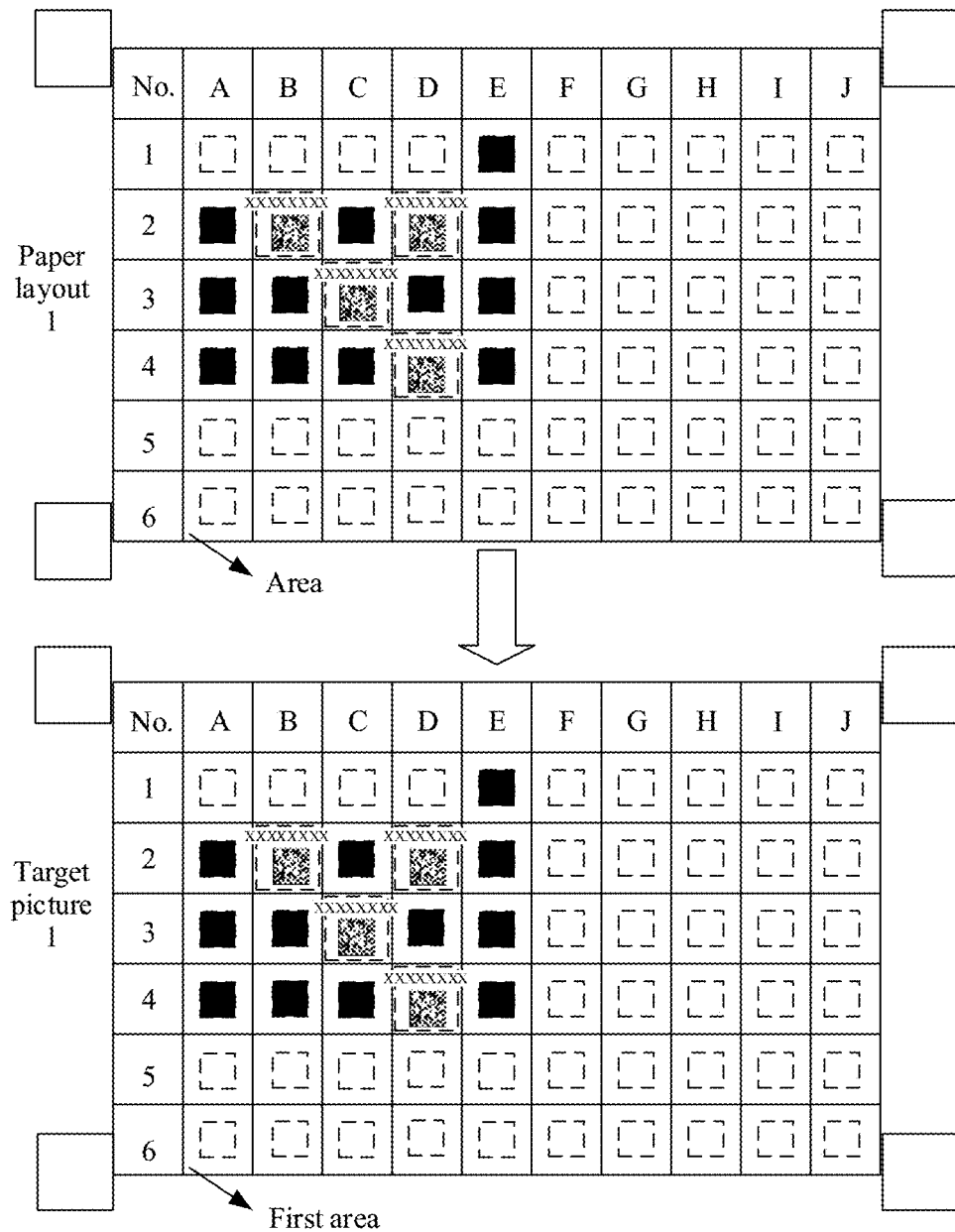
FIG. 7 is a schematic diagram of generating a target picture according to an embodiment of this application.
Figure 7A:
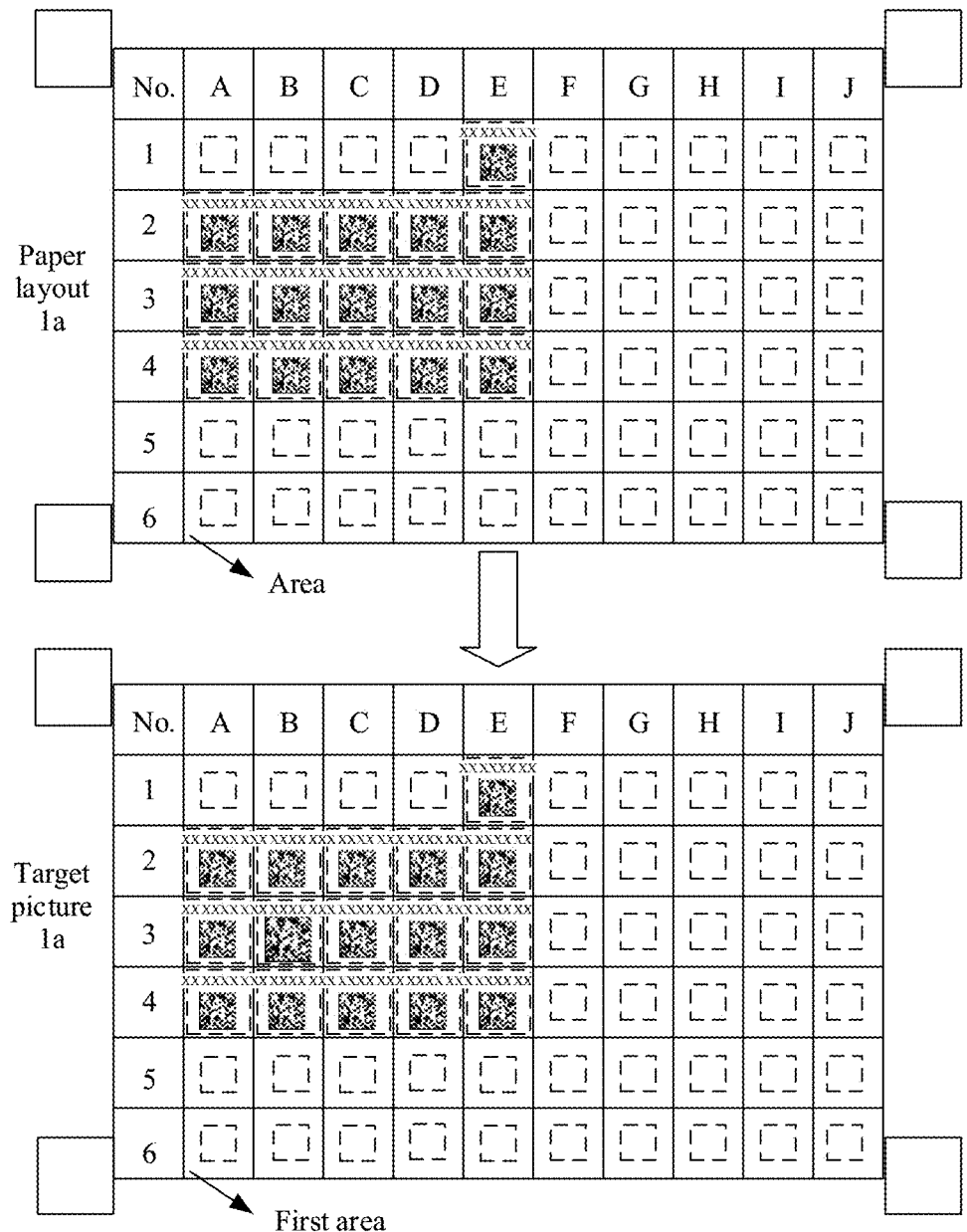
FIG. 7*a* is a schematic diagram of generating a target picture according to an embodiment of this application.

When mounting a photovoltaic array, a skilled person may record a mounting position of each converter in the photovoltaic array by using the paper layout. When a converter is mounted below a photovoltaic module, before mounting the photovoltaic module, the skilled person may remove, from the converter, a two-dimensional code sticker carrying a two-dimensional code of the converter, and the sticker may further display a product identifier of the converter. The skilled person pastes the sticker in a corresponding area in the paper layout. For example, each first area in the paper layout indicates one module identifier. A converter 1 is mounted below a photovoltaic module 3 in the second row and the second column in the photovoltaic array, and after the mounting of the converter 1 is completed, the skilled person removes a two-dimensional code sticker 1 on the converter 1, and pastes the removed two-dimensional code sticker 1 in an area B2 corresponding to the photovoltaic module 3. If no converter is mounted below a photovoltaic module, the skilled person paints a small box black in a corresponding area in the paper layout. After the mounting of the photovoltaic array is completed, the skilled person may complete the paper layout. Referring to FIG. 7, FIG. 7a, and FIG. 4, FIG. 7 is a schematic diagram of generating a target picture according to an embodiment of this application. After completing mounting of a photovoltaic array, the skilled person may complete a paper layout based on a paper layout 1 in FIG. 4 to obtain a paper layout 1 in FIG. 7. It can be learned from the paper layout 1 in FIG. 7 that converters are mounted below photovoltaic modules corresponding to areas B2, D2, C3, and D4, and no converter is mounted below photovoltaic modules corresponding to areas A2-4, B3-4, C1, C4, D5, and E1-4. FIG. 7a is another schematic diagram of generating a target picture according to an embodiment of this application. After completing mounting of a photovoltaic array, the skilled person may complete drawing of a paper layout based on the paper layout 1 in FIG. 4 to obtain a paper layout 1a in FIG. 7a. It can be learned from the paper layout 1a in FIG. 7a that converters are mounted below photovoltaic modules corresponding to areas A2-4, B2-4, C2-4, D2-4, and E1-4.

When an area identifier is used to indicate a plurality of photovoltaic modules in each first area in the paper layout, the skilled person may mark a module identifier at a preset position of at least one photovoltaic module in each first area. A preset position of each photovoltaic module may be a position of an area identifier corresponding to the photovoltaic module.

Figure 8:
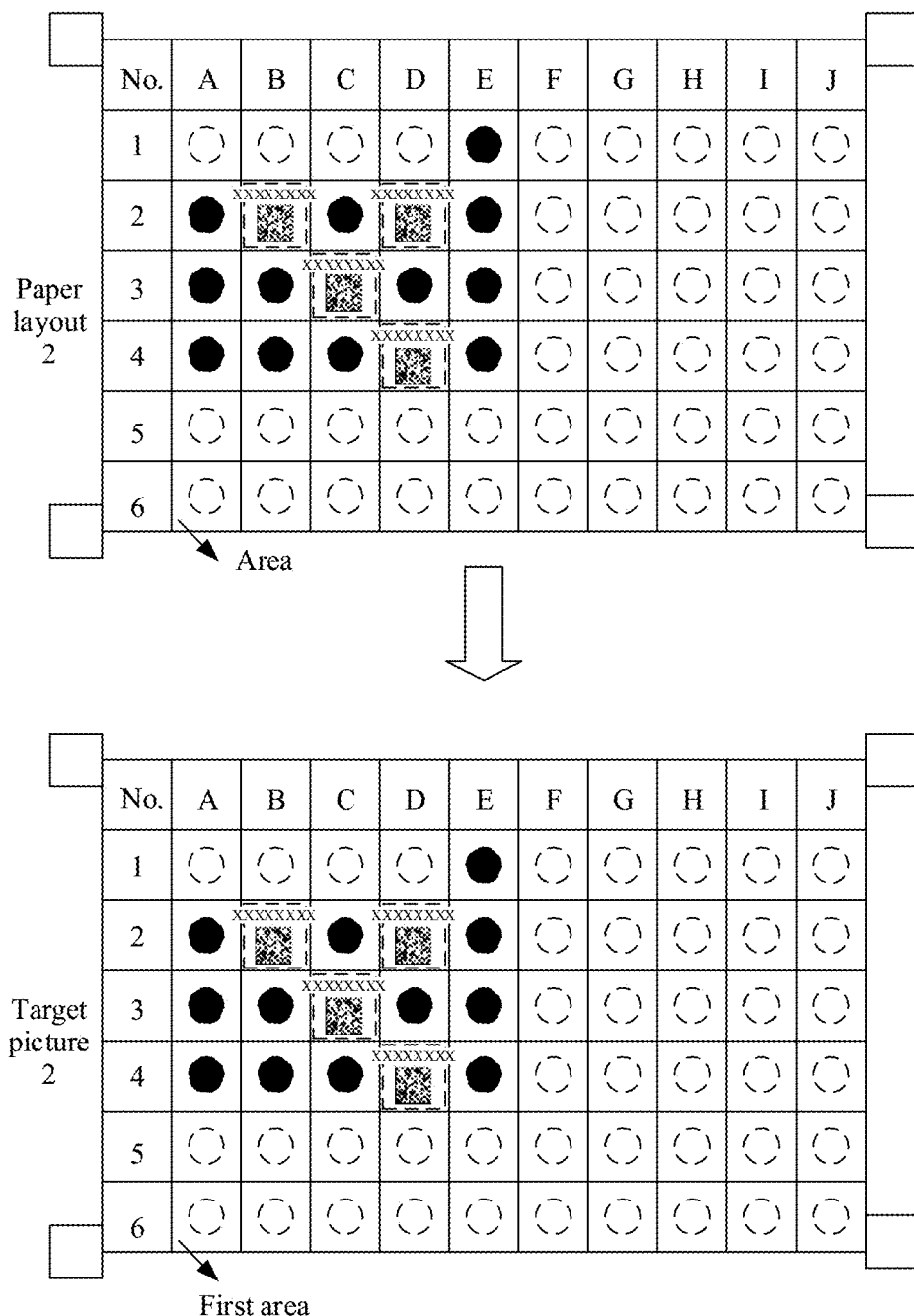
FIG. 8 is a schematic diagram of generating a target picture according to an embodiment of this application.
Figure 8A:
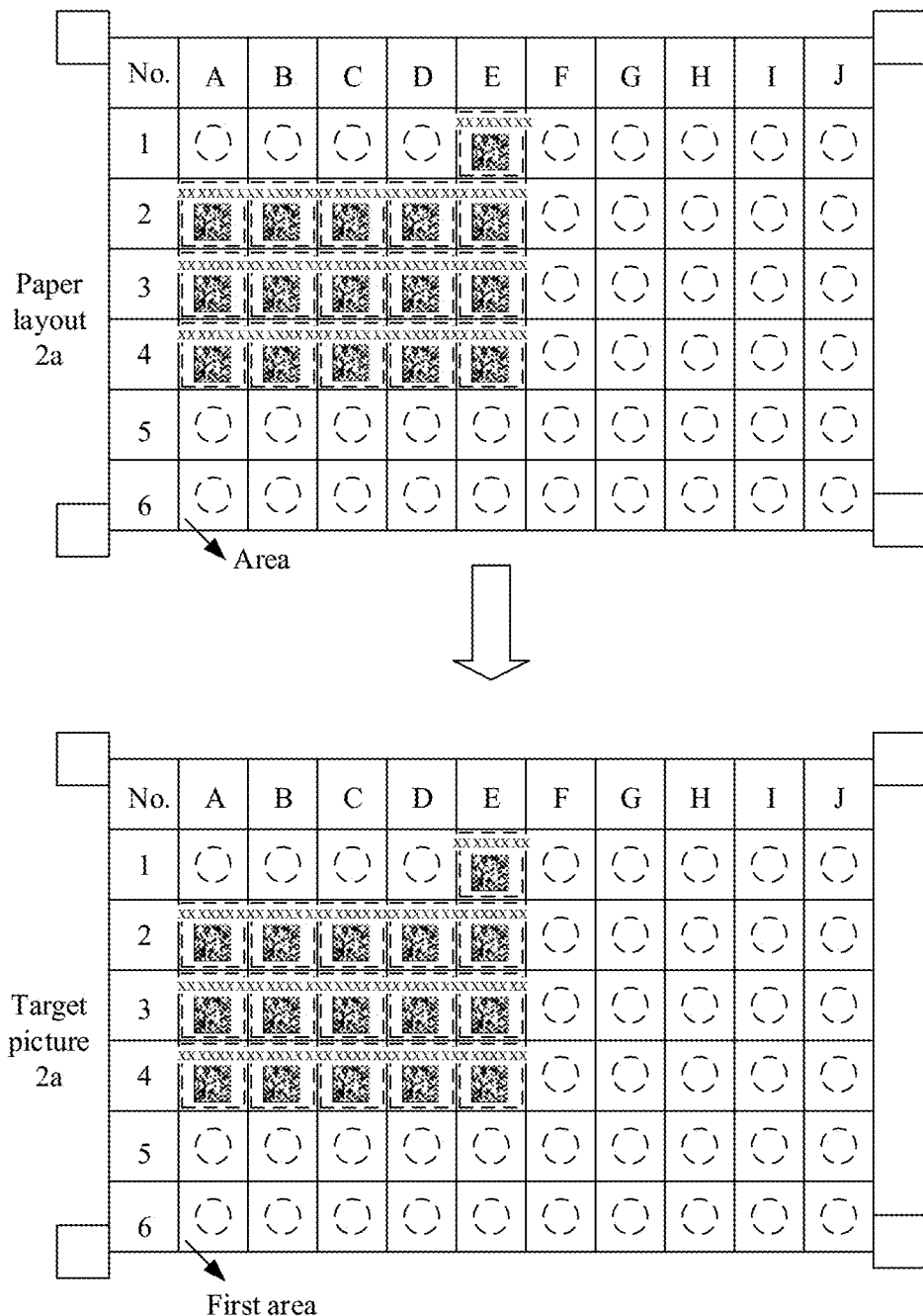
FIG. 8*a* is a schematic diagram of generating a target picture according to an embodiment of this application.

In an embodiment, when one area identifier is used to indicate a plurality of photovoltaic modules in each area in the paper layout, if a converter is mounted below any photovoltaic module indicated by any area, the skilled person pastes a module identifier on the converter in the area. If no converter is mounted below all photovoltaic modules indicated by any area, the skilled person paints an area identifier black in the area. Referring to FIG. 8, FIG. 8a, and FIG. 5, FIG. 8 is a schematic diagram of generating a target picture according to an embodiment of this application. After completing mounting of a photovoltaic array, the skilled person may complete drawing of a paper layout based on a paper layout 2 in FIG. 5 to obtain a paper layout 2 in FIG. 8. It can be learned from the paper layout 2 in FIG. 8 that converters are mounted below photovoltaic modules corresponding to areas B2, D2, C3, and D4, and no converter is mounted below photovoltaic modules corresponding to areas A2-4, B3-4, C1, C4, D5, and E1-4. FIG. 8a is another schematic diagram of generating a target picture according to an embodiment of this application. After completing mounting of a photovoltaic array, the skilled person may complete drawing of a paper layout based on the paper layout 2 in FIG. 5 to obtain a paper layout 2a in FIG. 8a. It can be learned from the paper layout 2a in FIG. 8a that converters are mounted below photovoltaic modules corresponding to areas A2-4, B2-4, C2-4, D2-4, and E1-4.

Figure 9:
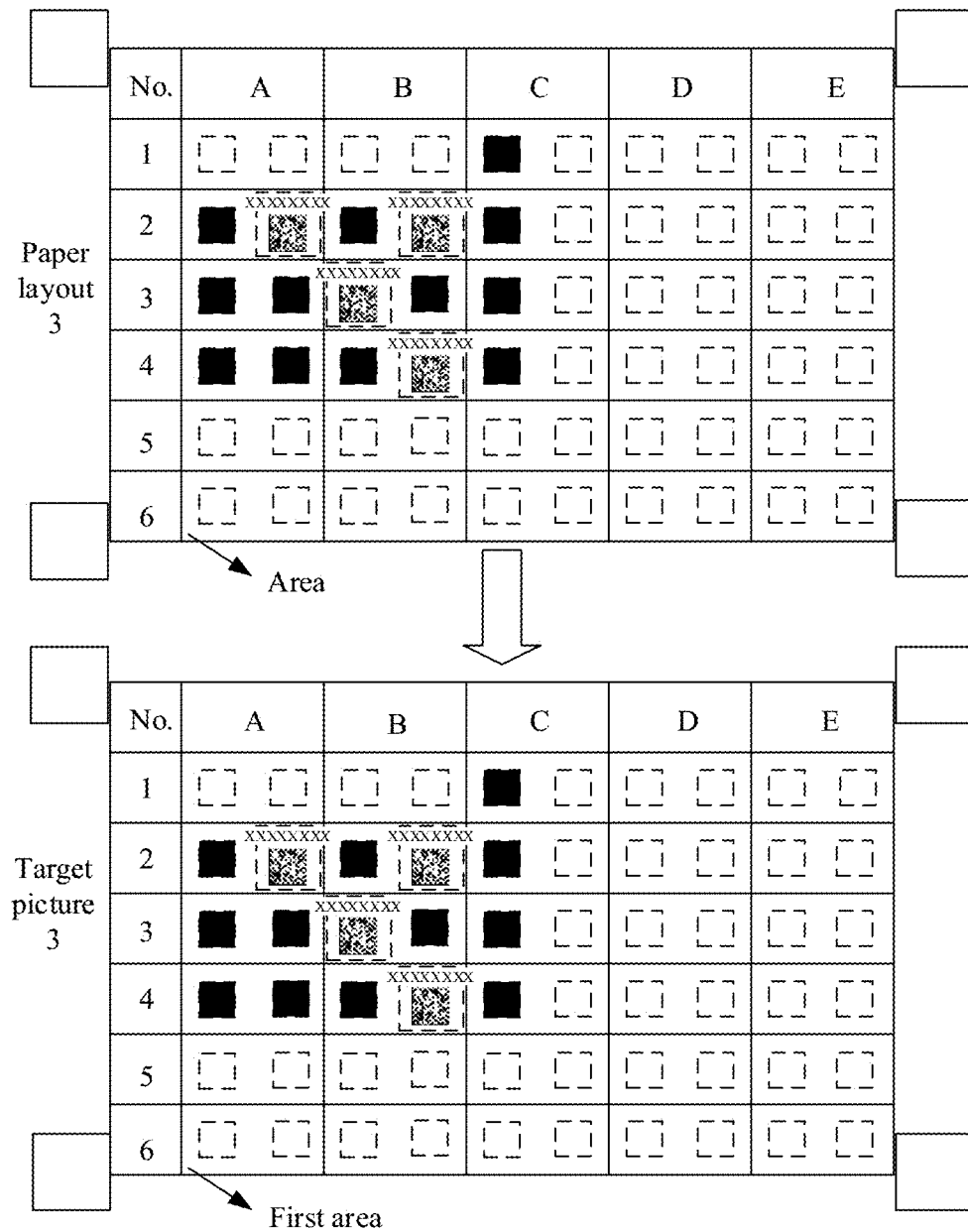
FIG. 9 is a schematic diagram of generating a target picture according to an embodiment of this application.
Figure 9A:
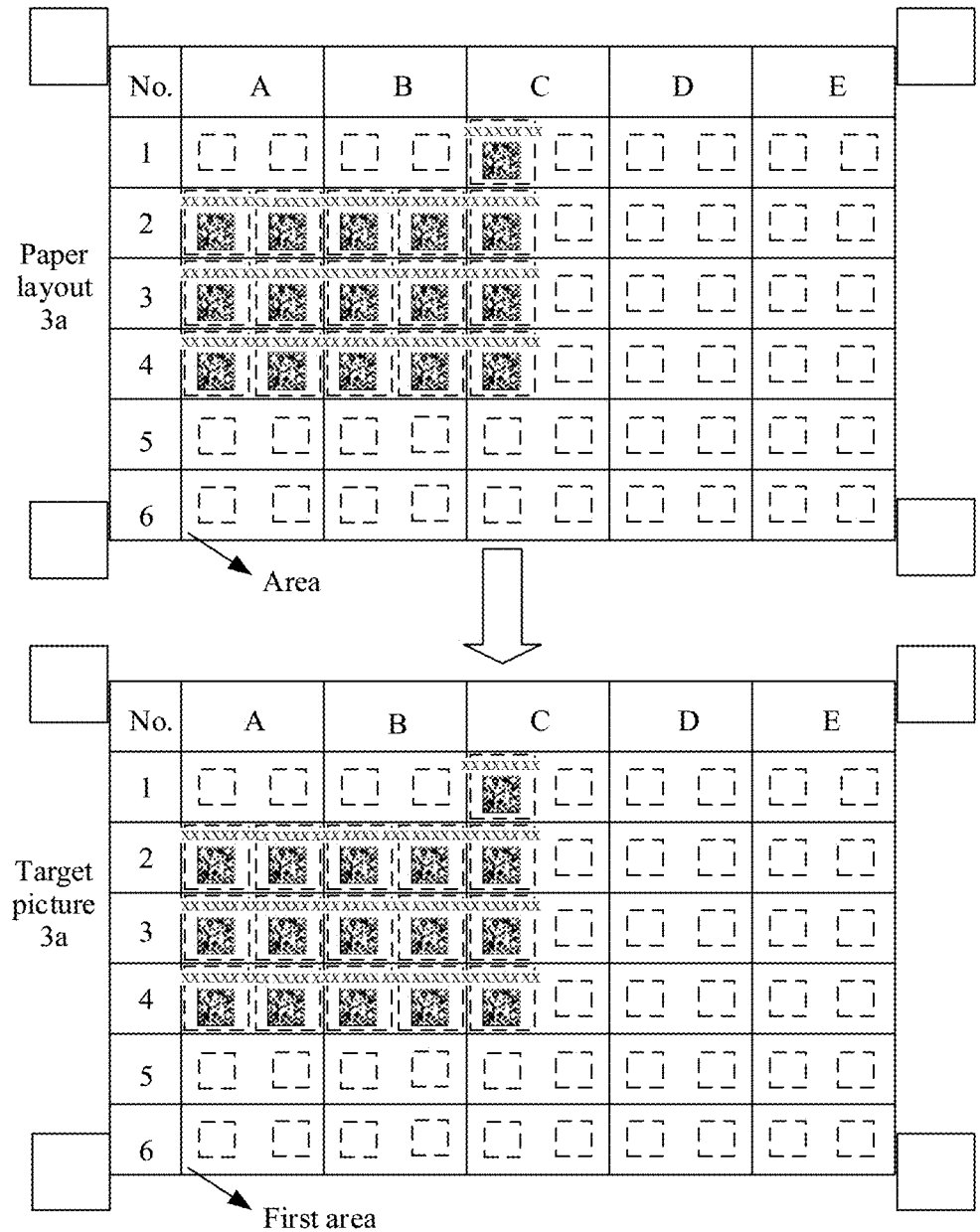
FIG. 9*a* is a schematic diagram of generating a target picture according to an embodiment of this application.

In an embodiment, when a plurality of area identifiers are used to indicate a plurality of photovoltaic modules in each area in the paper layout, if a converter is mounted below any photovoltaic module indicated by any area, the skilled person pastes a module identifier on the converter at a preset position of the photovoltaic module in the area. If no converter is mounted below any photovoltaic module indicated by any area, the skilled person paints an area identifier corresponding to the photovoltaic module black in the area. Referring to FIG. 9, FIG. 9a, and FIG. 6, FIG. 9 is a schematic diagram of generating a target picture according to an embodiment of this application. After completing mounting of a photovoltaic array, the skilled person may complete drawing of a paper layout based on a paper layout 3 in FIG. 6 to obtain a paper layout 3 in FIG. 9. It can be learned from the paper layout 3 in FIG. 9 that for two photovoltaic modules indicated in an area A2, if a left area identifier in the area A2 is painted black, the black area identifier is used to indicate that no converter is mounted below a photovoltaic module indicated by the area identifier, and if a module identifier is pasted on a right area identifier in the area A2, the area identifier pasted with the module identifier is used to indicate that a converter is mounted below a photovoltaic module indicated by the area identifier. FIG. 9a is a schematic diagram of generating a target picture according to an embodiment of this application. After completing mounting of a photovoltaic array, the skilled person may complete drawing of a paper layout based on the paper layout 3 in FIG. 6 to obtain a paper layout 3a in FIG. 9a. It can be learned from the paper layout 3a in FIG. 9a that for two photovoltaic modules indicated in an area A2, if module identifiers are pasted on both a left area identifier and a right area identifier in the area A2, the area identifier pasted with the module identifier is used to indicate that a converter is mounted below a photovoltaic module indicated by the area identifier.

For any target picture, the target picture may be used to reflect each part in a paper layout. When the paper layout represents at least one photovoltaic array, the target picture may include at least one first area array of N×M, each first area array corresponds to one photovoltaic array, and each first area in each first area array corresponds to at least one photovoltaic module in one photovoltaic array, where both N and M are positive integers greater than 0. A quantity of area arrays in the target picture and a layout of an area array are not limited in this embodiment of this application. This embodiment of this application illustrates the following operations by using an example in which there is one area array of a photovoltaic array in the target picture.

Figure 10:
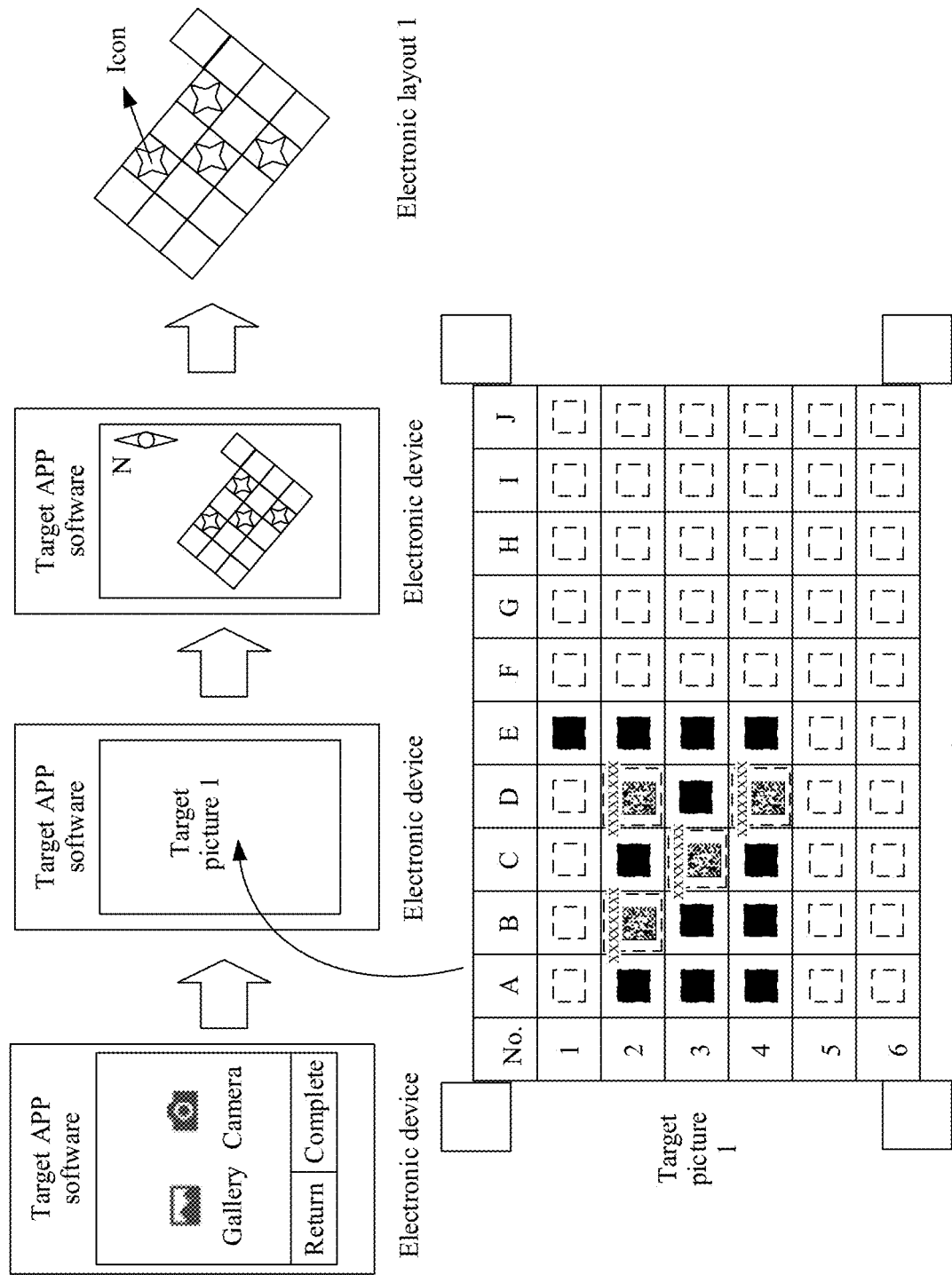
FIG. 10 is a schematic diagram of obtaining an electronic layout applied to a photovoltaic array according to an embodiment of this application.

The electronic device may obtain the target picture of the paper layout through target APP software. In an embodiment, the target APP software is displayed on a display interface of the electronic device, and the skilled person issues an instruction of opening the target APP software to the electronic device through the target APP software on the display interface of the electronic device. When the electronic device receives the instruction, the electronic device displays a user interface in the target APP software. When the electronic device receives a photographing instruction, the target APP software of the electronic device enables a photographing function. When the paper layout is within a photographing range of the electronic device, the electronic device may photograph the paper layout through the photographing function of the target APP software to obtain the target picture. FIG. 10 is a schematic diagram of obtaining an electronic layout applied to a photovoltaic array according to an embodiment of this application. A user interface of an electronic device in FIG. 10 displays a "Gallery" icon and a "Camera" icon. A user may click the "Camera" icon, and the electronic device receives a photographing instruction, thereby photographing a paper layout to obtain a target picture. Certainly, when the target picture of the paper layout is stored in the electronic device, the electronic device may directly obtain the stored target picture of the paper layout. Still taking FIG. 10 as an example, the user clicks the "Gallery" icon, and the electronic device displays pictures stored in the electronic device to the user. The user searches the displayed pictures for the target picture of the paper layout, and when the electronic device clicks the target picture, target software in the electronic device may obtain the target picture.

Alternatively, when the electronic device receives a scanning instruction, the target APP software of the electronic device enables a scanning function. When the paper layout is within a scanning range of the electronic device, the electronic device may scan the paper layout through the scanning function of the target APP software to obtain the target picture 302. The electronic device identifies each first area in the target picture to obtain position information and a module identifier of at least one photovoltaic module in each first area.

The module identifier in each first area in the target picture is a module identifier marked in each area in the paper layout. When identifying each first area in the target picture, the electronic device may identify a module identifier of at least one photovoltaic module in each area in the paper layout.

Position information of each photovoltaic module is information indicating a position of each photovoltaic module in the first area in the target picture, and the position information of each photovoltaic module may be coordinate information of each photovoltaic module in the first area in the target picture.

A process of identifying the first area in the target picture by the electronic device may include a process of detecting a position of each first area and a process of obtaining the module identifier in each first area. In an embodiment, operation 302 may be implemented by a process shown in operations 302A to 302C described below.

Operation 302A: The electronic device detects a position of each first area in the target picture to obtain coordinate information of the at least one photovoltaic module in each first area in the target picture.

Coordinate information of a first area is a coordinate value of at least one photovoltaic module in the first area in the target picture. The electronic device may determine the position of each first area in the target picture through position detection. Then, the electronic device generates a coordinate value based on the position of each first area in the target picture, and then the electronic device determines the coordinate information of the at least one photovoltaic module in the first area based on a preset position of each photovoltaic module in each first area.

The electronic device may determine the position of each first area in the target picture through position detection in any one of the following manner 1, manner 2, and manner 3, but this is not to the three manners.

Manner 1: The electronic device determines coordinate information of each first area by directly detecting a position index of each first area.

When a row index of each first area is displayed at a first target position in the target picture and a column index of each first area is displayed at a second target position, the first electronic device determines the coordinate information of each first area by detecting the row index and the column index of each first area. The first target position is a column header or a column tail of each column, and the first target position is a row header and a row tail of each row.

In an embodiment, when detecting any first area, the electronic device detects a row header of a row in which the first area is located, to obtain a row index of the first area, and the electronic device detects a column header of a column in which the first area is located, to obtain a column index of the first area. The electronic device combines the row index and the column index of the first area to obtain coordinate information of the first area.

Still taking FIG. 5 as an example, when the electronic device detects a first area at a position in the first row and the fifth column in the target picture, the electronic device detects that a row index displayed at a row header of the first row is 1, and the electronic device detects that a column index displayed at a column header of the fifth column is E. In this case, the electronic device combines the detected row index and the detected column index to obtain E1, and uses E1 as coordinate information of the first area.

Manner 2: The electronic device uses a reference point as an origin of a coordinate axis, and determines coordinate information of each first area by detecting a position of each first area relative to the reference point.

The reference point may be any point in the target picture. For example, a point in an upper left corner of a first area at a position in the first row and the first column in the target picture is the reference point. The relative position includes a horizontal relative position and a longitudinal relative position. A horizontal relative position of any first area is a quantity of first areas between the first area on a horizontal axis of the coordinate axis and the reference point plus 1, and a longitudinal relative position of any first area is a quantity of first areas between the first area on a longitudinal axis of the coordinate axis and the reference point plus 1. For example, if a quantity of first areas between the first area in the first row and the first column in the target picture on the horizontal axis of the coordinate axis and the reference point is 0, a horizontal relative position of the first area is 0+1=1. If a quantity of first areas between the first area in the first row and the first column in the target picture on the longitudinal axis of the coordinate axis and the reference point is 0, a longitudinal relative position of the first area is 0+1=1.

In an embodiment, when the electronic device detects that any first area is an $X^{th}$ first area on the horizontal axis of the coordinate axis, a horizontal relative position of the first area is X. When the electronic device detects that the first area is a $Y^{th}$ first area on the longitudinal axis of the coordinate axis, a longitudinal relative position of the first area is Y. The electronic device combines the horizontal relative position X and the longitudinal relative position Y of the first area to obtain a relative position (X, Y) of the first area, and uses the relative position (X, Y) as coordinate information of the first area.

Manner 3: The electronic device determines a coordinate axis based on at least three target identifiers in the target picture, and the electronic device determines coordinate information of each first area based on a distance of an area identifier in each first area from the coordinate axis.

The at least three target identifiers are identifiers displayed in the paper layout, and the at least three target identifiers are marked to be distributed around the paper layout, for example, small boxes around the paper layout in FIG. 4. In this case, when the electronic device photographs the paper layout, corresponding target identifiers are also displayed around the obtained target picture. After detecting the at least three target identifiers, the electronic device may determine a range of an entire paper layout based on the at least three target identifiers. When the electronic device detects distribution of three target identifiers distributed in a right angle in the target picture, the three target identifiers include a first target identifier, a second target identifier, and a third target identifier. The electronic device may use a center of the first target identifier as an origin of the coordinate axis, use a connection line between a center of the second target identifier and the center of the first target identifier as a horizontal axis of the coordinate axis, and use a connection line between a center of the third target identifier and the center of the first target identifier as a longitudinal axis of the coordinate axis, so that the electronic device can determine the coordinate axis. A coordinate plane in which the coordinate axis is located may include at least one first area in the target picture.

In an embodiment, when the electronic device detects that any area identifier is an $X^{th}$ area identifier in a direction of the horizontal axis of the coordinate axis, a horizontal coordinate of the area identifier is X. When the electronic device detects that the area identifier is a $Y^{th}$ area identifier in a direction of the longitudinal axis of the coordinate axis, a longitudinal coordinate of the area identifier is Y. In this case, coordinate information of the area identifier is (X, Y). The electronic device may use the coordinate information (X, Y) of the area identifier as coordinate information of a first area in which the area identifier is located.

The coordinate information of the first area may be determined in any one of the foregoing three manners. When there is one photovoltaic module in the first area, the coordinate information of the first area may be used as coordinate information of the photovoltaic module in the first area. When the first area indicates a plurality of photovoltaic modules, the electronic device determines coordinate information of each photovoltaic module in the first area based on a preset position of each photovoltaic module in the first area. In an embodiment, when a preset position of any photovoltaic module in the first area is Z preset positions, and the coordinate information of the first area is (X, Y), (X, Y, Z) may be used as coordinate information of the photovoltaic module.

When there are a plurality of area identifiers in each first area, a preset position of each photovoltaic module in the first area may be a position of an area identifier of each photovoltaic module in the first area. The electronic device may identify the area identifiers based on an order of the area identifiers in the first area, to obtain coordinate information of each photovoltaic module indicated by the first area. For example, there are two area identifiers in a first area A2 in FIG. 9, a left area identifier is painted black, and a right area identifier displays a module identifier. When the electronic device identifies the first area identifier on the left of the first area A2 from left to right, coordinate information of a photovoltaic module indicated by the area identifier is (A, 2, 1). Then, the electronic device continues to perform identification rightwards in the first area A2. When the second area identifier is identified, coordinate information of a photovoltaic module indicated by the area identifier is (A, 2, 2).

It should be noted that an order in which the electronic device identifies area identifiers in a first area is not limited in this embodiment of this application.

Operation 302B: The electronic device uses the coordinate information of the at least one photovoltaic module in each first area as the position information of the at least one photovoltaic module in the first area.

Still taking the example in operation 302A as an example, the obtained coordinate information E1 is used as position information of a photovoltaic module in the identified first area.

Operation 302C: The electronic device performs identification at a preset position of the at least one photovoltaic module in each first area to obtain at least one module identifier in each first area.

The preset position may be a central position of the first area or another position in the first area. A quantity of preset positions in the first area is the same as a quantity of photovoltaic modules in the first area. In other words, each preset position corresponds to one photovoltaic module. The preset position is not limited in this embodiment of this application. For example, when identifying a two-dimensional code at a preset position of any area, the electronic device may use the two-dimensional code as a module identifier in the first area. When identifying a template character string at a preset position of any area, the electronic device may use the target character string as a module identifier in the first area. Both the two-dimensional code and the character string are first-type module identifiers. In this embodiment of this application, an example in which the first-type module identifier is a two-dimensional code is used for description.

It should be noted that the electronic device may first perform position detection on each first area, and then obtain a module identifier in each first area. Alternatively, when the electronic device completes position detection on one first area and obtaining of a module identifier, the electronic device may then perform position detection on a next first area in the target picture and obtain a module identifier. Alternatively, the electronic device may simultaneously perform a position detection operation and a module identifier obtaining operation on one first area.

303. The electronic device obtains an electronic layout of the photovoltaic array based on the position information and the module identifier of the at least one photovoltaic module in each first area.

The electronic layout includes a plurality of virtual modules, each virtual module corresponds to one photovoltaic module in the photovoltaic array, and a position of each virtual module in the electronic layout is a position of the corresponding photovoltaic module in the photovoltaic array.

The virtual module is a preset module provided by the skilled person in advance for drawing the electronic layout. The virtual module may be in any form, and the virtual module is not limited in this embodiment of this application.

The electronic device may implement operation 303 through either a process 1 or a process 2. The process 1 is a process in which the electronic device obtains a result list based on the position information and the module identifier of the at least one photovoltaic module in each first area, and then obtains the electronic layout based on content in the result list. It can be learned that in the process 1, the electronic layout is not obtained based on a real-time identification result. The process 2 is a process of obtaining the electronic layout based on position information and a module identifier that are obtained through real-time identification.

Figure 13:
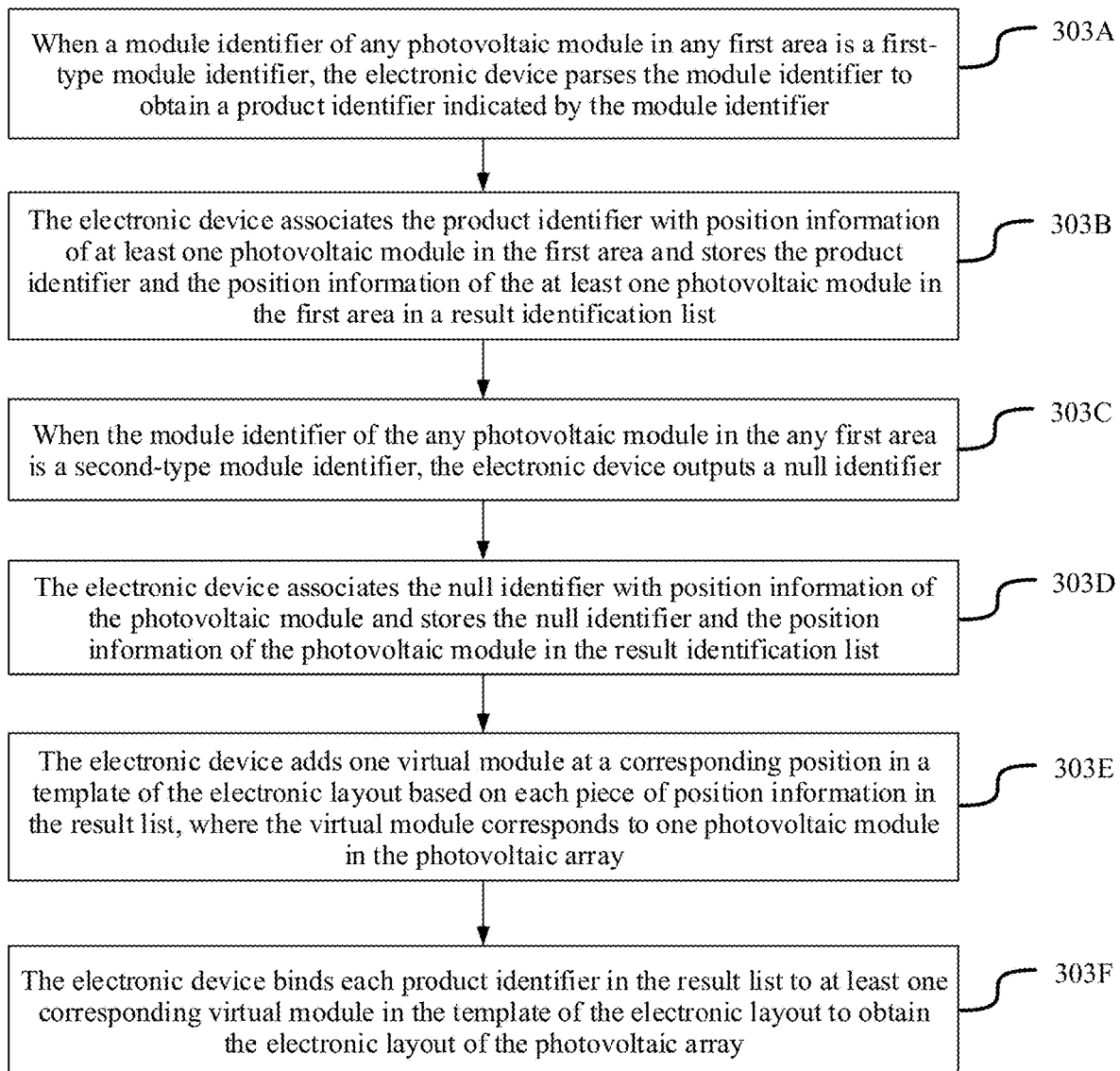
FIG. 13 is a flowchart of a method for obtaining an electronic layout applied to a photovoltaic array according to an embodiment of this application.

For a further description of the process shown in the process 1, refer to FIG. 13. FIG. 13 is a flowchart of a method for obtaining an electronic layout applied to a photovoltaic array according to an embodiment of this application. The method includes the following operations.

Operation 303A: When a module identifier of any photovoltaic module in any first area is a first-type module identifier, the electronic device parses the module identifier to obtain a product identifier indicated by the module identifier.

The electronic device may detect the module identifier to determine whether the detected module identifier is a first-type module identifier. In an embodiment, the electronic device detects a module identifier in a target area. When detecting that a module identifier in any first area is a first-type module identifier, the electronic device performs operation 303. For example, the first-type module identifier is a two-dimensional code. When detecting that the module identifier in the any first area is a two-dimensional code, the electronic device parses the two-dimensional code to obtain a product serial number indicated by the two-dimensional code.

Operation 303B: The electronic device associates the product identifier with position information of at least one photovoltaic module in the first area and stores the product identifier and the position information of the at least one photovoltaic module in the first area in the result list.

The electronic device may store the product identifier and the position information of each photovoltaic module in the first area in a same row of the result list, so that the product identifier is associated with the position information of the at least one photovoltaic module in the first area.

Operation 303C: When the module identifier of the any photovoltaic module in the any first area is a second-type module identifier, the electronic device outputs a null identifier.

A manner of determining, by the electronic device, whether the module identifier is a second-type module identifier is similar to a manner of determining whether the module identifier is a first-type module identifier. The manner of determining, by the electronic device, whether the module identifier is a second-type module identifier is not described in this embodiment of this application.

The null identifier may be represented by any character string, for example, NA, and is used to indicate that the module identifier cannot indicate a product serial number.

It should be noted that in an embodiment, when the module identifier of the any photovoltaic module in the any first area is a second-type module identifier, the electronic device does not output any result.

Operation 303D: The electronic device associates the null identifier with position information of the photovoltaic module and stores the null identifier and the position information of the photovoltaic module in the result list.

The electronic device may store the null identifier and the position information of the photovoltaic module in a same row of the result list, so that the null identifier is associated with the position information of the photovoltaic module.

It should be noted that a process shown in operations 303A to 303D is a process in which the electronic device obtains the result list based on the position information and the module identifier of the at least one photovoltaic module in each first area, and the null identifier and the product identifier obtained by the electronic device in operations 303A and 303C may be used as a product description in the result list.

To further reflect each photovoltaic module in the photovoltaic array and a converter in the result list, the electronic device may add a module description to the result list. In an embodiment, when the module identifier of the any photovoltaic module in the any first area is a first-type module identifier, a module description output by the electronic device is "a photovoltaic module and a converter are mounted". When the module identifier of the any photovoltaic module in the any first area is a second-type module identifier, a module description output by the electronic device is "a photovoltaic module is mounted but no converter is mounted". When a module identifier in the any first area is a second-type module identifier, a module description output by the electronic device is a "null identifier" or is empty, and the electronic device associates the module description with position information of the photovoltaic module and stores the module description and position information of the photovoltaic module in the result list.

Taking FIG. 7 as an example, it can be learned from Table 1 that there is no module identifier in a first area A1, that is, neither a photovoltaic module nor a converter is mounted at a position corresponding to the first area A1 in the photovoltaic array. A module identifier in a first area E1 is a second-type module identifier, that is, a photovoltaic module is mounted at a position corresponding to the first area E1 in the photovoltaic array, but no converter is mounted. A module identifier in a first area B2 is a first-type module identifier, that is, a photovoltaic module and a converter are mounted at a position corresponding to the first area B2 in the photovoltaic array, and a product identifier of the mounted converter is

TABLE 1

| Sequence number | Position information | Module description | Product description |
|---|---|---|---|
| 1 | A1 | NA | NA |
| 2 | B1 | NA | NA |
| ... | ... | ... | ... |
| 5 | E1 | A photovoltaic module is mounted but no converter is mounted. | NA |
| ... | ... | ... | ... |
| 12 | B2 | A photovoltaic module and a converter are mounted. | XXXXXXXX |
| ... | ... | ... | ... |
| 59 | I6 | NA | NA |
| 60 | J6 | NA | NA |

In an embodiment, the electronic device may not store information about a first area having no module identifier in the result list, but stores only information about a first area having a module identifier, thereby improving efficiency of generating the result list and reducing memory consumption of the electronic device. Referring to Table 2, it can be learned that information about a first area having no module identifier is not stored in Table 2, but only information about a first area having a module identifier is stored.

TABLE 2

| Sequence number | Position information | Module description | Product description |
|---|---|---|---|
| 1 | E1 | A photovoltaic module is mounted but no converter is mounted. | NA |
| 2 | A2 | A photovoltaic module is mounted but no converter is mounted. | NA |
| ... | ... | ... | ... |
| 5 | D2 | A photovoltaic module and a converter are mounted. | XXXXXXXX |
| ... | ... | ... | ... |
| 11 | E3 | A photovoltaic module is mounted but no converter is mounted. | NA |

TABLE 2-continued

| Sequence number | Position information | Module description | Product description |
|---|---|---|---|
| 12 | A4 | A photovoltaic module is mounted but no converter is mounted. | NA |
| ... | ... | ... | ... |
| 16 | E4 | A photovoltaic module is mounted but no converter is mounted. | NA |

Taking FIG. 7a as an example, it can be learned from Table 1a that there is no module identifier in a first area A1, that is, neither a photovoltaic module nor a converter is mounted at a position corresponding to the first area A1 in the photovoltaic array. Module identifiers in first areas E1 and B2 are first-type module identifiers, that is, a photovoltaic module and a converter are mounted at a position corresponding to the first area E1 in the photovoltaic array, and a product identifier of the mounted converter is XXXXXXXX. There is no second-type module identifier in the first area.

TABLE 1a

| Sequence number | Position information | Module description | Product description |
|---|---|---|---|
| 1 | A1 | NA | NA |
| 2 | B1 | NA | NA |
| ... | ... | ... | ... |
| 5 | E1 | A photovoltaic module and a converter are mounted. | XXXXXXXX |
| ... | ... | ... | ... |
| 12 | B2 | A photovoltaic module and a converter are mounted. | XXXXXXXX |
| ... | ... | ... | ... |
| 59 | I6 | NA | NA |
| 60 | J6 | NA | NA |

In an embodiment, the electronic device may not store information about a first area having no module identifier in the result list, but stores only information about a first area having a module identifier, thereby improving efficiency of generating the result list and reducing memory consumption of the electronic device. Referring to Table 2a, it can be learned that information about a first area having no module identifier is not stored in Table 2a, but only information about a first area having a module identifier is stored.

TABLE 2a

| Sequence number | Position information | Module description | Product description |
|---|---|---|---|
| 1 | E1 | A photovoltaic module and a converter are mounted. | XXXXXXXX |
| 2 | A2 | A photovoltaic module and a converter are mounted. | XXXXXXXX |
| ... | ... | ... | ... |
| 5 | D2 | A photovoltaic module and a converter are mounted. | XXXXXXXX |
| ... | ... | ... | ... |
| 11 | E3 | A photovoltaic module and a converter are mounted. | XXXXXXXX |
| 12 | A4 | A photovoltaic module and a converter are mounted. | XXXXXXXX |
| ... | ... | ... | ... |
| 16 | E4 | A photovoltaic module and a converter are mounted. | XXXXXXXX |

Operation 303E: The electronic device adds one virtual module at a corresponding position in a template of the electronic layout based on each piece of position information in the result list, where the virtual module corresponds to one photovoltaic module in the photovoltaic array.

The template of the electronic layout is a template provided by the skilled person in advance for drawing the electronic layout. The electronic device may draw the electronic layout on the template of the electronic layout based on position information and a product identifier of the at least one photovoltaic module in each first area.

The electronic device may add a virtual module to the template of the electronic layout based on position information read from the result list. In an embodiment, when the electronic device reads one piece of position information from the result list, the electronic device adds one virtual module at a corresponding position in the template of the electronic layout.

Operation 303F: The electronic device binds each product identifier in the result list to at least one corresponding virtual module in the template of the electronic layout to obtain the electronic layout of the photovoltaic array.

The at least one virtual module corresponds to at least one photovoltaic module in a first area in which the product identifier is located.

In an embodiment, when the electronic device reads one product identifier from the result list, the electronic device performs operation 303F. It should be noted that a virtual module is not bound to a null identifier, but is bound to only a product identifier. For example, if a product description of the electronic device in the first row in Table 2 is a null identifier NA, the electronic device does not need to bind the null identifier NA to a corresponding virtual module.

The electronic device may bind a product identifier to a corresponding virtual module in any one of the following manners 4 to 6.

Manner 4: The electronic device directly displays any product identifier on at least one corresponding virtual module.

Manner 5: The electronic device displays any product identifier on one icon, and displays the icon on at least one corresponding virtual module.

Manner 6: The electronic device associates any product identifier with icon information of one icon and stores any product identifier and icon information of one icon, and displays, on at least one corresponding virtual module, the icon indicated by the icon information.

The icon information may be any piece of information for uniquely indicating one icon. The icon information is not limited in this embodiment of this application.

Taking Table 2 as an example, when the electronic device reads a product identifier XXXXXXXX in the fifth row in Table 2, the electronic device associates the product identifier XXXXXXXX and icon information 1 and stores the product identifier and icon information 1. The electronic device stores, on a corresponding virtual module in the electronic layout, an icon 1 indicated by the icon information 1.

After the electronic device completes reading of at least one piece of data in the result list, it means that the electronic device completes adding of at least one corresponding virtual module to the template of the electronic layout, and completes binding of at least one product identifier in the result list to a corresponding virtual module. In this case, the electronic layout obtains a template of a current electronic layout as the electronic layout.

Figure 10A:
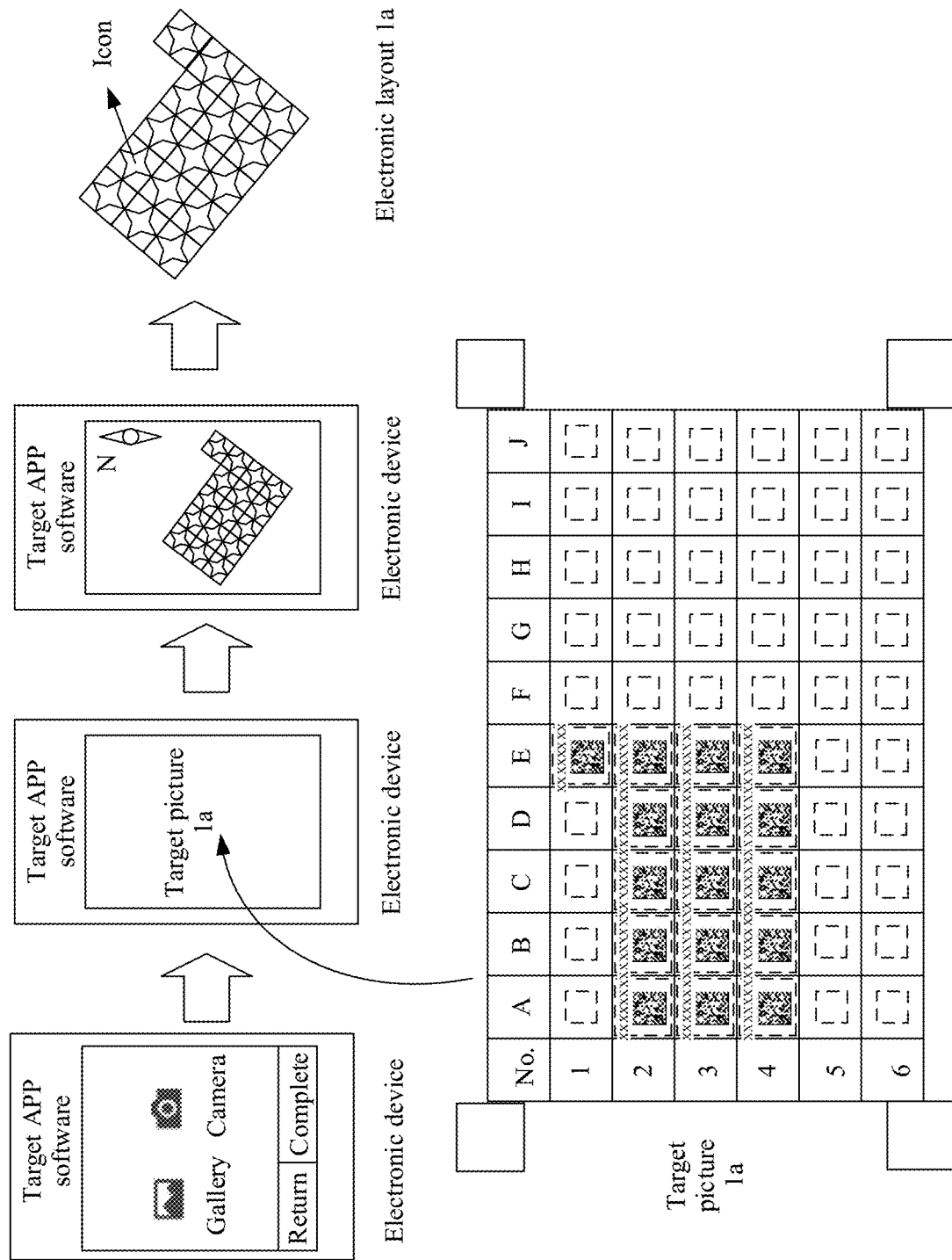
FIG. 10*a* is a schematic diagram of obtaining an electronic layout applied to a photovoltaic array according to an embodiment of this application.

For example, in FIG. 10 and FIG. 7, after the electronic device completes identification of a target picture 1 in FIG. 7, a result list X may be obtained. The electronic device may obtain an electronic layout 1 based on position information and a product identifier in the result list X. Each icon in the electronic layout 1 is bound to one product identifier, and each icon is further displayed on one virtual module. It can be learned that a converter is mounted below a photovoltaic module corresponding to the virtual module. In FIG. 10*a* and FIG. 7*a*, after the electronic device completes identification of a target picture 1*a* in FIG. 10*a*, a result list X may be obtained. The electronic device may obtain an electronic layout 1*a* based on position information and a product identifier in the result list X. Each icon in the electronic layout 1*a* is bound to one product identifier, and each icon is further displayed on one virtual module. It can be learned that a converter is mounted below a photovoltaic module corresponding to the virtual module.

Figure 11:
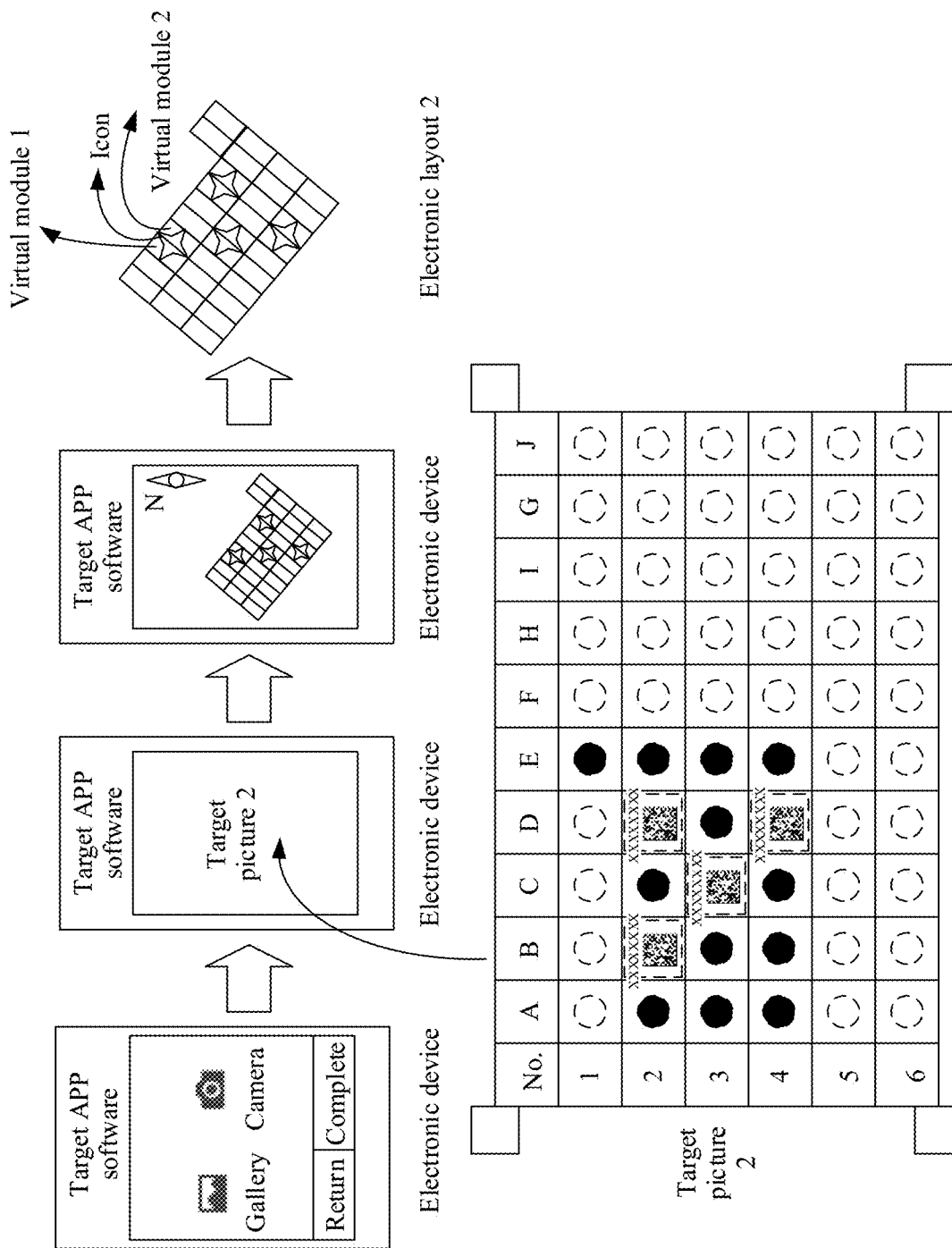
FIG. 11 is a schematic diagram of obtaining an electronic layout applied to a photovoltaic array according to an embodiment of this application.
Figure 11A:
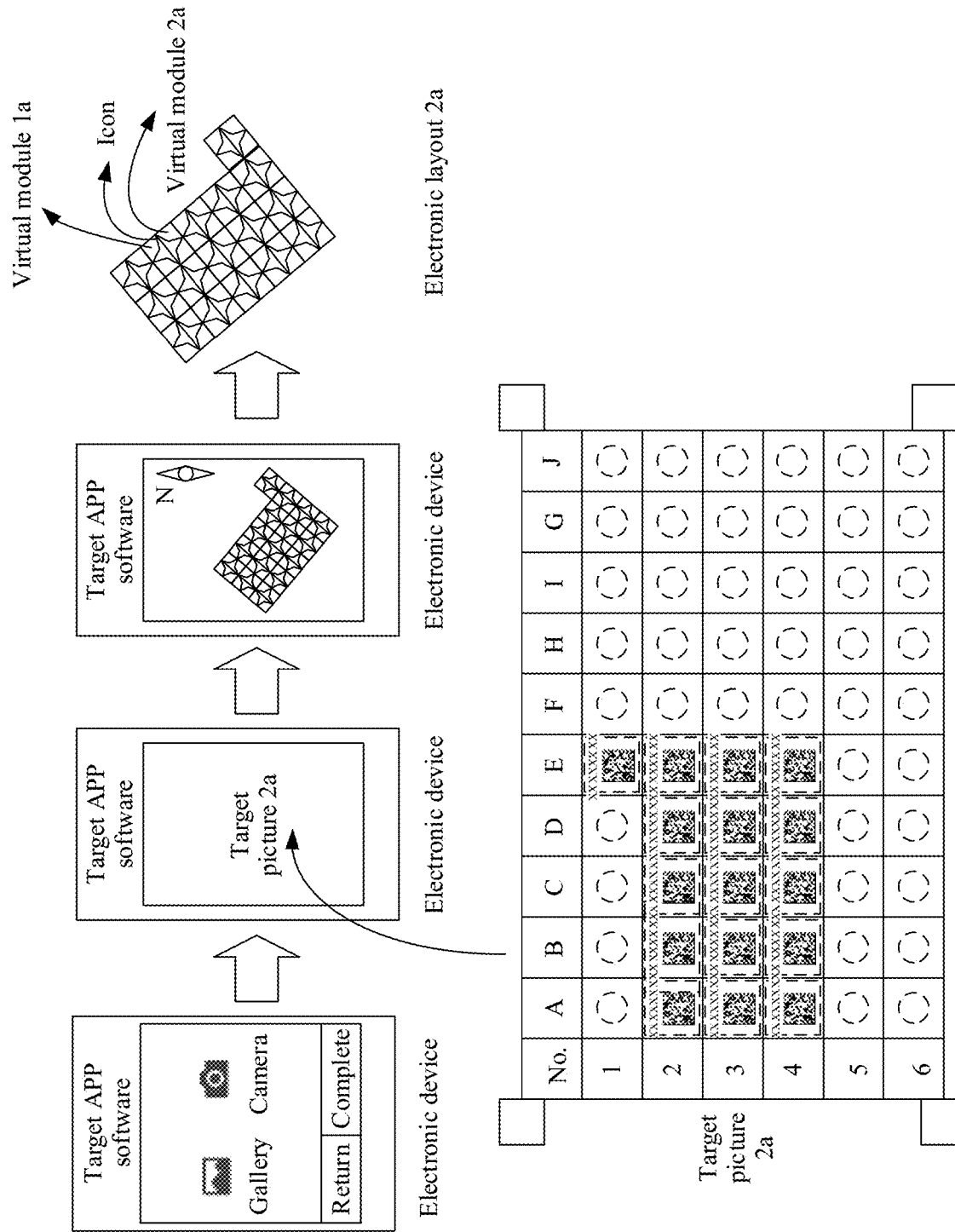
FIG. 11*a* is a schematic diagram of obtaining an electronic layout applied to a photovoltaic array according to an embodiment of this application.

For another example, in FIG. 11 and FIG. 8, FIG. 11 is a schematic diagram of obtaining an electronic layout applied to a photovoltaic array according to an embodiment of this application. After the electronic device completes identification of a target picture 2 in FIG. 8, a result list Y may be obtained. The electronic device may obtain an electronic layout 2 based on position information and a product identifier in the result list Y. Each icon in the electronic layout 2 is bound to one product identifier, and each icon is further displayed on two virtual modules. For example, the icon is displayed on virtual modules 1 and 2. It can be learned that converters are mounted below two photovoltaic modules corresponding to the virtual modules 1 and 2. In FIG. 11*a* and FIG. 8*a*, FIG. 11*a* is a schematic diagram of obtaining an electronic layout applied to a photovoltaic array according to an embodiment of this application. After the electronic device completes identification of a target picture 2*a* in FIG. 8*a*, a result list Y may be obtained. The electronic device may obtain an electronic layout 2*a* based on position information and a product identifier in the result list Y. Each icon in the electronic layout 2*a* is bound to one product identifier, and each icon is further displayed on two virtual modules. For example, the icon is displayed on virtual modules 1*a* and 2*a*. It can be learned that converters are mounted below two photovoltaic modules corresponding to the virtual modules 1*a* and 2*a*.

Figure 12:
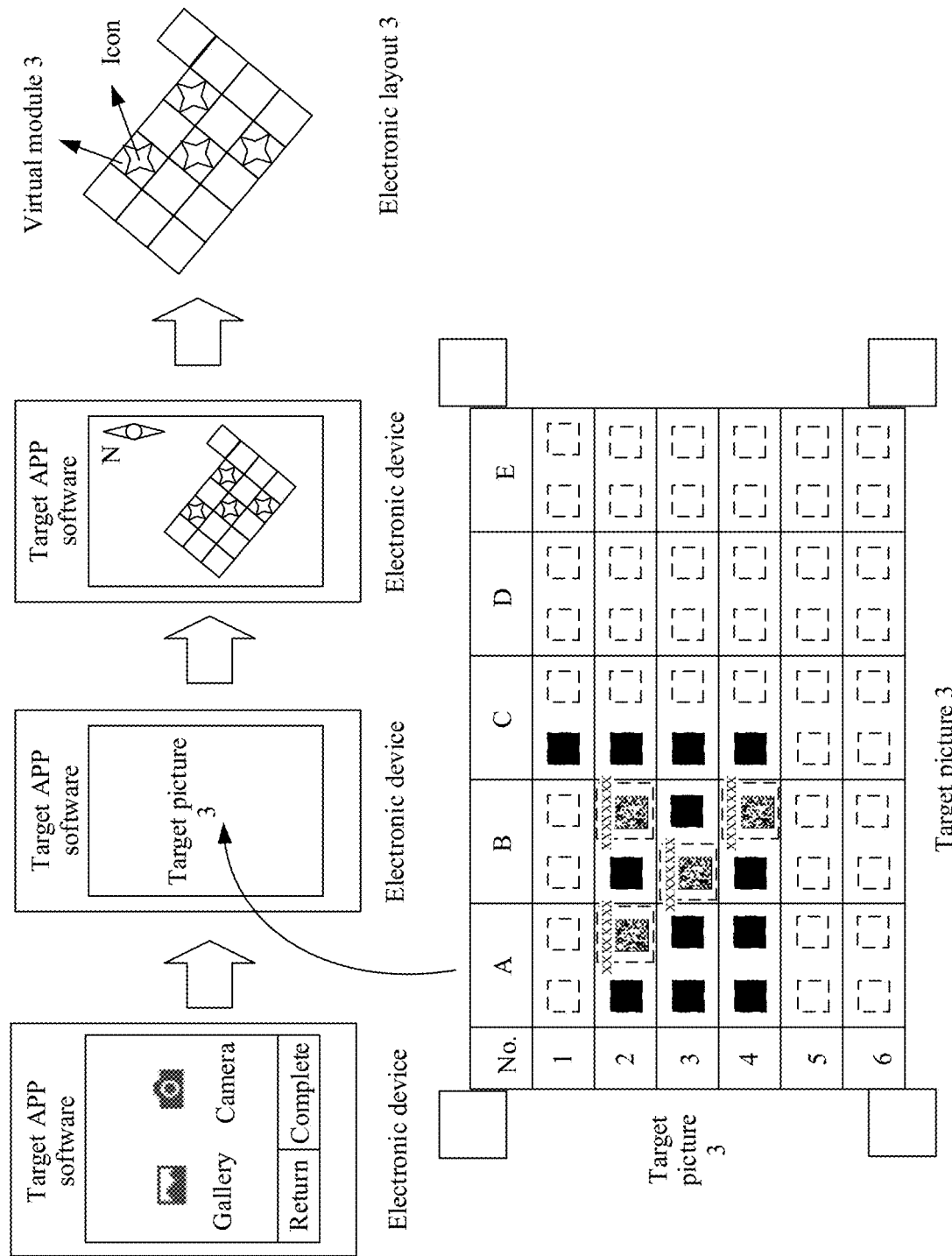
FIG. 12 is a schematic diagram of obtaining an electronic layout applied to a photovoltaic array according to an embodiment of this application.
Figure 12A:
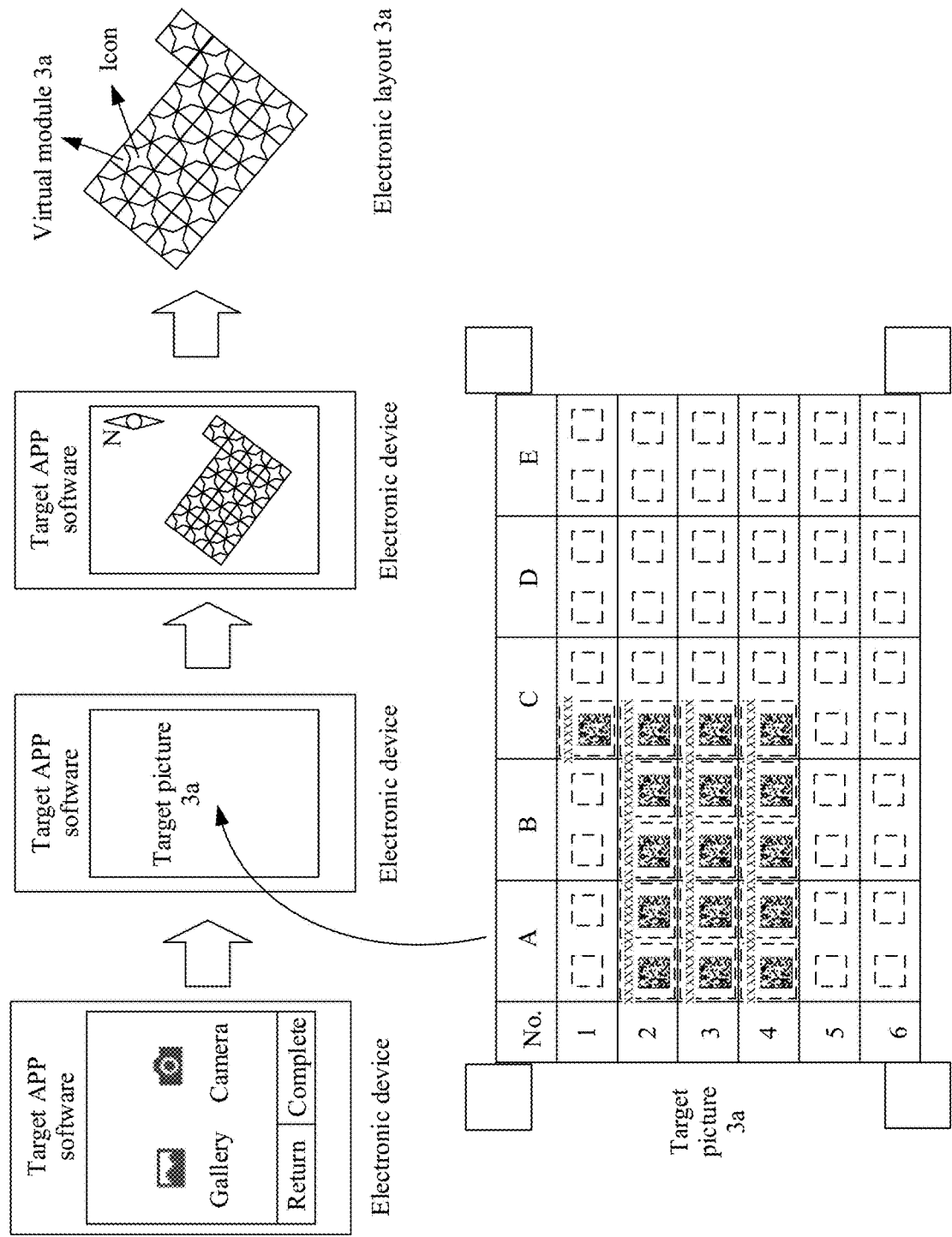
FIG. 12*a* is a schematic diagram of obtaining an electronic layout applied to a photovoltaic array according to an embodiment of this application.

For another example, in FIG. 12 and FIG. 9, FIG. 12 is a schematic diagram of obtaining an electronic layout applied to a photovoltaic array according to an embodiment of this application. After the electronic device completes identification of a target picture 3 in FIG. 9, a result list Z may be obtained. The electronic device may obtain an electronic layout 3 based on position information and a product identifier in the result list Z. Each first area in FIG. 9 may correspond to two virtual modules, each icon in the electronic layout 3 is bound to one product identifier, and each icon is further displayed on one virtual module. For example, the icon is displayed on a virtual module 3. It can be learned that a converter is mounted below a photovoltaic module corresponding to the virtual module 3. In FIG. 12*a* and FIG. 9*a*, FIG. 12*a* is a schematic diagram of obtaining an electronic layout applied to a photovoltaic array according to an embodiment of this application. After the electronic device completes identification of a target picture 3*a* in FIG. 9*a*, a result list Z may be obtained. The electronic device may obtain an electronic layout 3*a* based on position information and a product identifier in the result list Z. Each first area in FIG. 9*a* may correspond to two virtual modules, each icon in the electronic layout 3*a* is bound to one product identifier, and each icon is further displayed on one virtual module. For example, the icon is displayed on a virtual module 3*a*. It can be learned that a converter is mounted below a photovoltaic module corresponding to the virtual module 3*a*.

Figure 14:
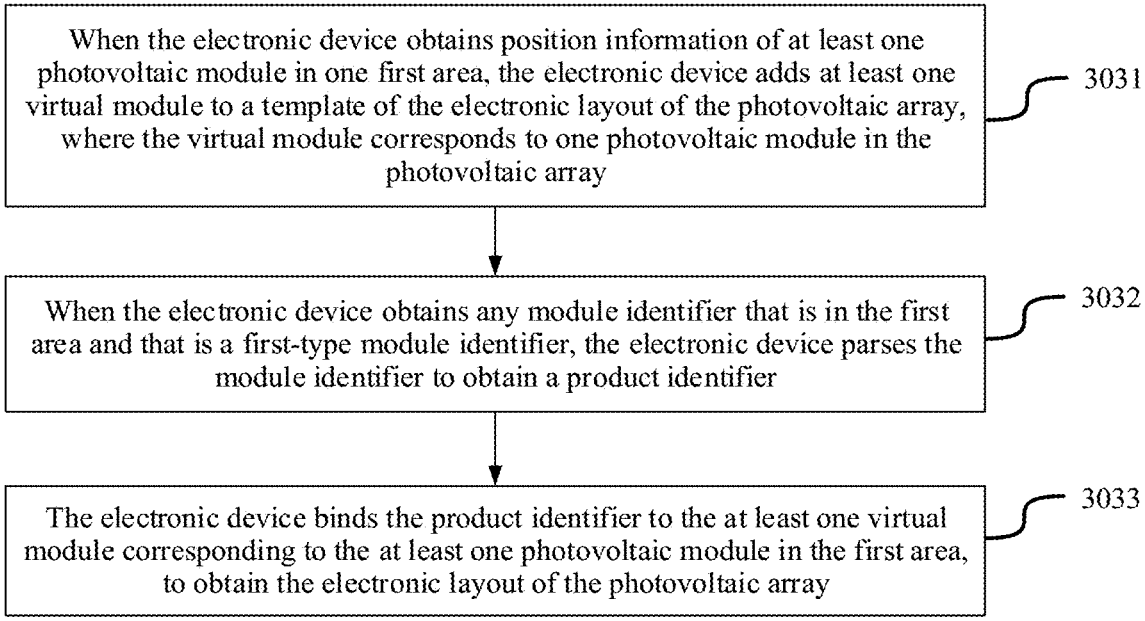
FIG. 14 is a flowchart of a method for obtaining an electronic layout applied to a photovoltaic array according to an embodiment of this application.

The electronic device obtains the electronic layout based on the result list. Alternatively, for example, in the process 2 described above, the electronic device may obtain the electronic layout based on a real-time identification result. For a further description of the process shown in the process 2, refer to FIG. 14. FIG. 14 is a flowchart of a method for obtaining an electronic layout applied to a photovoltaic array according to an embodiment of this application. The method includes the following operations.

Operation 3031: When the electronic device obtains position information of at least one photovoltaic module in one first area, the electronic device adds at least one virtual module to a template of the electronic layout of the photovoltaic array, where the virtual module corresponds to one photovoltaic module in the photovoltaic array.

After identifying any first area in the target picture, the electronic device obtains position information of at least one photovoltaic module in the first area. The electronic device may directly perform operation 3031 based on obtained position information of the first area.

Certainly, the electronic device may perform operation 3031 when the electronic device obtains position information of all photovoltaic modules in one first area.

Operation 3032: When the electronic device obtains any module identifier that is in the first area and that is a first-type module identifier, the electronic device parses the module identifier to obtain a product identifier.

After identifying any preset position in any first area in the target picture, the electronic device obtains a module identifier in the first area. When the module identifier is a first-type module identifier, the electronic device performs operation 3032.

Operation 3033: The electronic device binds the product identifier to the at least one virtual module corresponding to the at least one photovoltaic module in the first area, to obtain the electronic layout of the photovoltaic array.

After the electronic device completes identification of at least one first area in the target picture, it means that the electronic device completes adding of at least one corresponding virtual module to the template of the electronic layout, and completes binding of at least one product identifier to a corresponding virtual module. In this case, the electronic layout obtains a template of a current electronic layout as the electronic layout.

Based on the processes shown in FIG. 13 and FIG. 14, it can be learned that the electronic device may directly generate the electronic layout based on the position information and the module identifier of the at least one photovoltaic module in the identified first area without manual intervention, thereby reducing labor time consumption and improving efficiency of generating the electronic layout.

304. The electronic device stores the electronic layout of the photovoltaic array in a plurality of devices in a photovoltaic power generation system, where the plurality of devices in the photovoltaic power generation system support data synchronization and backup.

The plurality of devices in the photovoltaic power generation system include a converter, an inverter, a network management device, and the like. The electronic device may store the electronic layout of the photovoltaic array in any one of the devices by using a wired network or a wireless network. When the photovoltaic power generation system raises a converter failure alarm, the skilled person may connect the network management device or a mobile phone to the inverter, so that the mobile phone can read the electronic layout of the photovoltaic array from the inverter, and display the electronic layout on a user interface. In this way, the skilled person may determine, from the electronic layout based on a product identifier of the faulty converter reported in the photovoltaic power generation system, a virtual module bound to the product identifier. Because each virtual module corresponds to one photovoltaic module in the photovoltaic array, the skilled person may determine a mounting position of the faulty converter.

When any of the devices that store the electronic layout fails, the skilled person may replace the faulty device with a new device. Because the plurality of devices that store the electronic layout all support data synchronization and backup, the new device may synchronize the electronic layout from another device that stores the electronic layout, thereby avoiding a loss of the electronic layout.

Figure 15:
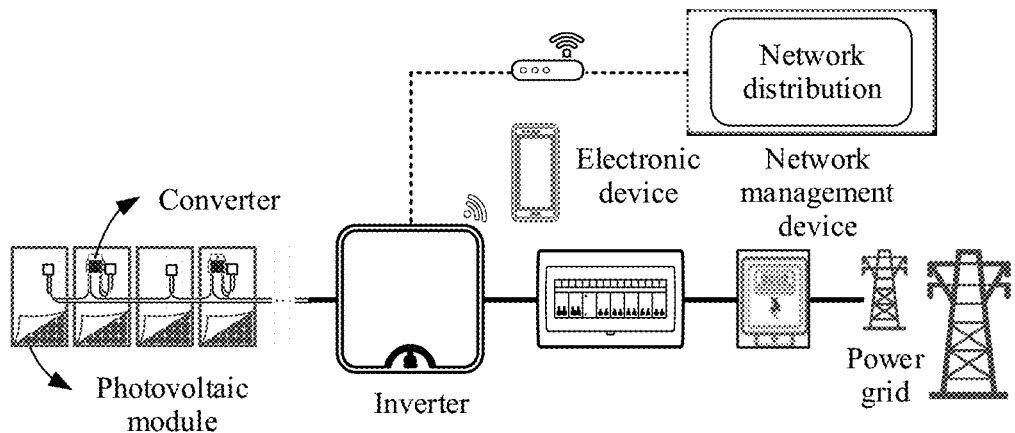
FIG. 15 is a schematic diagram of an application scenario according to an embodiment of this application.

FIG. 15 is a schematic diagram of an application scenario according to an embodiment of this application. An inverter in FIG. 15 may be connected to an electronic device and a network management device by using a wireless network. The electronic device may import an electronic layout into the inverter and the network management device by using the wireless network, and the inverter may import the electronic layout imported by the electronic device into a converter. When the inverter fails and is replaced by a new inverter, the new inverter may synchronize the electronic layout from the converter or the network management device, so that the electronic layout in the inverter can be directly displayed on another electronic device.

In this embodiment of this application, the electronic device identifies each first area in the target picture to obtain the position information and the module identifier of the at least one photovoltaic module in each first area, and may directly obtain the electronic layout based on the position information and the module identifier of each photovoltaic module. In this way, a product identifier of each converter does not need to be manually obtained, and a photovoltaic module does not need to be manually added to the electronic layout, thereby reducing labor time consumption and improving efficiency of obtaining the electronic layout. In addition, the electronic device may first identify a module identifier in the target picture, and then identify a first area in which the module identifier is located, to obtain position information of at least one photovoltaic module in the first area. Therefore, identification on a first area having no module identifier can be avoided, thereby improving efficiency of identifying the target picture by the electronic device. Moreover, when the electronic device stores information about a first area having a module identifier in the result list, efficiency of generating the result list can be improved and memory consumption of the electronic device can be reduced. Furthermore, the electronic layout obtained by the electronic device may be stored in the plurality of devices in the photovoltaic power generation system, and the plurality of devices can support data synchronization and backup, thereby avoiding a loss of the electronic layout.

Figure 16:
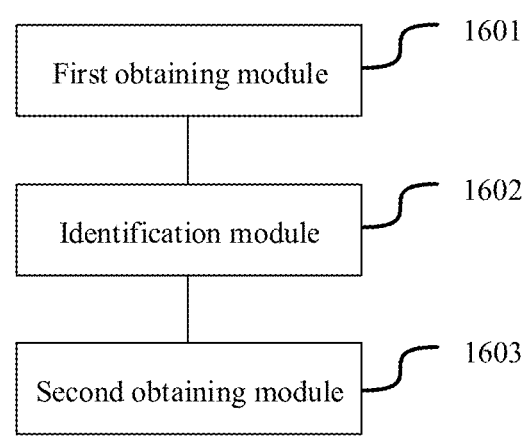
FIG. 16 is a schematic diagram of an apparatus for obtaining an electronic layout applied to a photovoltaic array according to an embodiment of this application.

FIG. 16 is a schematic diagram of an apparatus for obtaining an electronic layout applied to a photovoltaic array according to an embodiment of this application. The apparatus includes:

a first obtaining module 1601, configured to perform operation 301;

an identification module 1602, configured to perform operation 302; and a second obtaining module 1603, configured to perform operation 303.

In an embodiment, the identification module 1602 is configured to perform operations 302A to 302C.

In an embodiment, the second obtaining module 1603 includes:

an obtaining unit, configured to obtain a result list based on the position information and the module identifier of the at least one photovoltaic module in each first area;

an adding unit, configured to perform operation 303E; and a binding unit, configured to perform operation 303F.

In an embodiment, the obtaining unit is configured to perform operations 303A to 303D.

In an embodiment, the second obtaining module 1603 is configured to perform operations 3031 to 3033.

In an embodiment, the first obtaining module is configured to:

obtain the target picture by photographing or scanning a paper layout, where the paper layout includes at least one area, and at least one module identifier is marked in each area.

In an embodiment, the apparatus further includes:

a storage module, configured to perform operation 304.

At least one of the foregoing optional technical solutions may be randomly combined to form optional embodiments of the present disclosure, and details are not described herein again.

It should be noted that when the apparatus for obtaining an electronic layout applied to a photovoltaic array provided in the foregoing embodiment obtains an electronic layout of a photovoltaic array, division of the foregoing function modules is merely used as an example for description. In actual application, the foregoing functions may be allocated to different function modules for implementation as required, that is, an inner structure of the apparatus is divided into different function modules to implement all or some of the functions described above. In addition, the apparatus for obtaining an electronic layout applied to a photovoltaic array provided in the foregoing embodiment and the embodiment of the method for obtaining an electronic layout applied to a photovoltaic array pertain to a same concept. For a specific implementation process of the apparatus, refer to the method embodiment. Details are not described herein again.

A person of ordinary skill in the art may understand that all or some of the operations of the embodiments may be implemented by hardware or a program instructing related hardware. The program may be stored in a computer readable storage medium. The storage medium may be a read-only memory, a magnetic disk, or an optical disc.

The foregoing descriptions are merely example embodiments of this application, but are not intended to limit this application. Any modification, equivalent replacement, or improvement made without departing from the spirit and principle of this application should fall within the protection scope of this application.

The invention claimed is:

1. A method for obtaining an electronic layout of a photovoltaic array for an electronic device, the method comprising:

obtaining, by an electronic device, a target picture, wherein
the target picture comprises at least one first area indicating position information and a module identifier of at least one photovoltaic module from plurality of photovoltaic modules adjacent to each other in a photovoltaic array;

the position information indicates a position of the photovoltaic module within the plurality of photovoltaic modules;

the module identifier comprises a first-type module identifier or a second-type module identifier;

the first-type module identifier indicates that a converter is mounted below the photovoltaic module; and the second-type module identifier indicates that no converter is mounted below the photovoltaic module; and obtaining, by the electronic device, an electronic layout of the photovoltaic array based on the module identifier and position information indicating coordinate information of the at least one photovoltaic module in each first area, wherein the electronic layout comprises a plurality of virtual modules adjacent to each other that correspond to the plurality of photovoltaic modules, wherein the obtaining the electronic layout further comprises:

obtaining a result list based on the position information and the module identifier of the at least one photovoltaic module in each first area; and adding one virtual module from the plurality of virtual modules at a corresponding position in a template of the electronic layout based on each piece of the position information in the result list, wherein the virtual module corresponds to one photovoltaic module from the plurality of photovoltaic modules in the photovoltaic array.

2. The method according to claim 1, further comprising:
detecting, by the electronic device, a position of each first area in the target picture to obtain coordinate information of the at least one photovoltaic module in each first area in the target picture;

using, by the electronic device, the coordinate information of the at least one photovoltaic module in each first area as the position information of the at least one photovoltaic module in the first area; and performing, by the electronic device, identification at a preset position of the at least one photovoltaic module in each first area to obtain the module identifier of the at least one photovoltaic module in each first area.

3. The method according to claim 1, further comprising:
binding, by the electronic device, each product identifier in the result list to at least one corresponding virtual module in the template of the electronic layout to obtain the electronic layout of the photovoltaic array.

4. The method according to claim 3, further comprising:
when the module identifier of any photovoltaic module from the at least one photovoltaic module in any first area from the at least one first area is the first-type module identifier, parsing, by the electronic device, the module identifier to obtain the product identifier indicated by the module identifier;

associating, by the electronic device, the product identifier with the position information of at least one photovoltaic module in the first area and storing the product identifier and the position information of the at least one photovoltaic module in the first area in the result list; and when the module identifier of the photovoltaic module in the first area is the second-type module identifier, outputting, by the electronic device, a null identifier;

associating, by the electronic device, the null identifier with the position information of the photovoltaic module and storing the null identifier and the position information of the photovoltaic module in the result list.

5. The method according to claim 1, further comprising:
when the position information of at least one photovoltaic module in one of the at least one first area is obtained, adding, by the electronic device, at least one virtual module from the plurality of virtual modules to a template of the electronic layout of the photovoltaic array, wherein the virtual module corresponds to one photovoltaic module from the plurality of photovoltaic modules in the photovoltaic array;

when the module identifier that is in the first area and that is the first-type module identifier is obtained, parsing, by the electronic device, the module identifier to obtain a product identifier; and binding, by the electronic device, the product identifier to the at least one virtual module corresponding to the at least one photovoltaic module in the first area, to obtain the electronic layout of the photovoltaic array.

6. The method according to claim 1, further comprising:
obtaining, by the electronic device, the target picture by photographing or scanning a paper layout, wherein the paper layout comprises at least one area, and at least one module identifier is marked in each area.

7. The method according to claim 1, further comprising:
storing, by the electronic device, the electronic layout of the photovoltaic array in a plurality of devices in a photovoltaic power generation system, wherein the plurality of devices in the photovoltaic power generation system support data synchronization and backup.

8. An apparatus for obtaining an electronic layout operated in an electronic device, comprising:
a processor;
a memory to store instructions that, when executed by the processor, cause the processor to:
obtain a target picture, wherein
the target picture comprises at least one first area indicating position information and a module identifier of at least one photovoltaic module from plurality of photovoltaic modules adjacent to each other in a photovoltaic array;

the position information indicates a position of the photovoltaic module within the plurality of photovoltaic modules;

the module identifier comprises a first-type module identifier and a second-type module identifier;

the first-type module identifier indicates that a converter is mounted below the photovoltaic module;

the second-type module identifier indicates that no converter is mounted below the photovoltaic module; and obtain an electronic layout of the photovoltaic array based on based on the module identifier and position information indicating coordinate information of the at least one photovoltaic module in each first area, wherein the electronic layout comprises a plurality of virtual modules adjacent to each other that correspond to the plurality of photovoltaic modules, wherein the processor is further to:

obtain a result list based on the position information and the module identifier of the at least one photovoltaic module in each first area; and add one virtual module from the plurality of virtual modules at a corresponding position in a template of the electronic layout based on each piece of the position information in the result list, wherein the virtual module corresponds to one photovoltaic module from the plurality of photovoltaic modules in the photovoltaic array.

9. The apparatus according to claim 8, wherein the processor is further to:
   detect a position of each first area in the target picture to obtain coordinate information of the at least one photovoltaic module in each first area in the target picture;
   use the coordinate information of the at least one photovoltaic module in each first area as the position information of the at least one photovoltaic module in the first area; and
   perform identification at a preset position of the at least one photovoltaic module in each first area to obtain the module identifier of the at least one photovoltaic module in each first area.

10. The apparatus according to claim 8, wherein the processor is further to:
    bind each product identifier in the result list to at least one corresponding virtual module in the template of the electronic layout to obtain the electronic layout of the photovoltaic array.

11. The apparatus according to claim 10, wherein the processor is further to:
    when any module identifier in any first area from the at least one first area is the first-type module identifier, parse the module identifier to obtain the product identifier indicated by the module identifier;
    associate the product identifier with the position information of at least one photovoltaic module in the first area and store the product identifier and the position information of the at least one photovoltaic module in the first area in the result list; and
    when the module identifier of the photovoltaic module in the first area is the second-type module identifier, output a null identifier;
    associate the null identifier with the position information of the photovoltaic module and store the null identifier and the position information of the photovoltaic module in the result list.

12. The apparatus according to claim 8, wherein the processor is further to:
    when position information of at least one photovoltaic module in one first area is obtained, add at least one virtual module from the plurality of virtual modules to a template of the electronic layout of the photovoltaic array, wherein the virtual module corresponds to one photovoltaic module in the photovoltaic array from the plurality of photovoltaic modules;
    when any module identifier that is in the first area and that is the first-type module identifier is obtained, parse the module identifier to obtain a product identifier; and
    bind the product identifier to the at least one virtual module corresponding to the at least one photovoltaic module in the first area, to obtain the electronic layout of the photovoltaic array.

13. The apparatus according to claim 8, wherein the processor is further to:
    obtain the target picture by photographing or scanning a paper layout, wherein the paper layout comprises at least one area, and at least one module identifier is marked in each area.

14. The apparatus according to claim 8, wherein the processor is further to:
    a storage module, configured to store the electronic layout of the photovoltaic array in a plurality of devices in a photovoltaic power generation system, wherein the plurality of devices in the photovoltaic power generation system support data synchronization and backup.

15. A system for obtaining an electronic layout, comprising:
    a photovoltaic module;
    a converter; and
    an electronic device, wherein the electronic device is configured to:
        obtain a target picture, wherein
            the target picture comprises at least one first area indicating position information and a module identifier of at least one photovoltaic module from plurality of photovoltaic modules adjacent to each other in a photovoltaic array;
            the position information indicates a position of the photovoltaic module within the plurality of photovoltaic modules;
            the module identifier comprises a first-type module identifier and a second-type module identifier;
            the first-type module identifier indicates that the converter is mounted below the photovoltaic module;
            the second-type module identifier indicates that no converter is mounted below the photovoltaic module; and
        generate, by the electronic device, an electronic layout of the photovoltaic array based on the module identifier and position information indicating coordinate information of the at least one photovoltaic module in each first area, wherein the electronic layout comprises a plurality of virtual modules adjacent to each other that correspond to the plurality of photovoltaic modules, wherein the electronic device is further configured to:
            obtain a result list based on the position information and the module identifier of the at least one photovoltaic module in each first area; and
            add one virtual module from the plurality of virtual modules at a corresponding position in a template of the electronic layout based on each piece of the position information in the result list, wherein the virtual module corresponds to one photovoltaic module from the plurality of photovoltaic modules in the photovoltaic array.

16. The system according to claim 15, wherein the electronic device is configured to:
    detect a position of each first area in the target picture to obtain coordinate information of the at least one photovoltaic module in each first area in the target picture;
    use the coordinate information of the at least one photovoltaic module in each first area as the position information of the at least one photovoltaic module in the first area; and
    perform identification at a preset position of the at least one photovoltaic module in each first area to obtain the module identifier in each first area.

17. The system according to claim 15, wherein the electronic device is configured to:
    bind each product identifier in the result list to at least one corresponding virtual module in the template of the electronic layout to obtain the electronic layout of the photovoltaic array.

18. The system according to claim 15, wherein the electronic device is configured to:
    when position information of at least one photovoltaic module from the plurality of virtual modules in one first area is obtained, add at least one virtual module to a template of the electronic layout of the photovoltaic array, wherein the virtual module corresponds to one photovoltaic module in the photovoltaic array from the plurality of photovoltaic modules;

when any module identifier that is in the first area and that is the first-type module identifier is obtained, parse the module identifier to obtain a product identifier; and bind the product identifier to the at least one virtual module corresponding to the at least one photovoltaic module in the first area, to obtain the electronic layout of the photovoltaic array.

19. The system according to claim 15, wherein the electronic device is configured to obtain the target picture by photographing or scanning a paper layout, wherein the paper layout comprises at least one area, and at least one module identifier is marked in each area.

20. The system according to claim 15, wherein the electronic device is configured to store the electronic layout of the photovoltaic array in a plurality of devices in a photovoltaic power generation system, wherein the plurality of devices in the photovoltaic power generation system support data synchronization and backup.

* * * * *